US008881200B2

(12) United States Patent
Watanabe et al.

(10) Patent No.: US 8,881,200 B2
(45) Date of Patent: Nov. 4, 2014

(54) PROGRAM INFORMATION NOTIFICATION DEVICE, TELEVISION RECEIVER, PROGRAM INFORMATION NOTIFICATION METHOD, PROGRAM INFORMATION NOTIFICATION PROGRAM, AND RECORDING MEDIUM

(75) Inventors: Ryuhsuke Watanabe, Osaka (JP); Yukimi Kawaguchi, Osaka (JP); Yoshiyasu Ogasawara, Osaka (JP); Aya Minehara, Osaka (JP); Shunsuke Uesugi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 7 days.

(21) Appl. No.: 13/976,324

(22) PCT Filed: Dec. 28, 2011

(86) PCT No.: PCT/JP2011/080440
§ 371 (c)(1),
(2), (4) Date: Jun. 26, 2013

(87) PCT Pub. No.: WO2012/091105
PCT Pub. Date: Jul. 5, 2012

(65) Prior Publication Data
US 2013/0305293 A1 Nov. 14, 2013

(30) Foreign Application Priority Data

Dec. 28, 2010 (JP) .................. 2010-294119
Dec. 26, 2011 (JP) .................. 2011-284516

(51) Int. Cl.
| | | |
|---|---|---|
| H04N 5/445 | (2011.01) | |
| H04N 21/472 | (2011.01) | |
| H04N 21/431 | (2011.01) | |
| H04N 21/45 | (2011.01) | |
| H04N 21/475 | (2011.01) | |
| H04N 21/482 | (2011.01) | |
| H04N 21/485 | (2011.01) | |
| H04N 21/488 | (2011.01) | |
| H04N 21/84 | (2011.01) | |

(52) U.S. Cl.
CPC ..... *H04N 21/47214* (2013.01); *H04N 5/44543* (2013.01); *H04N 21/4316* (2013.01); *H04N 21/4532* (2013.01); *H04N 21/4755* (2013.01); *H04N 21/482* (2013.01); *H04N 21/485* (2013.01); *H04N 21/4882* (2013.01); *H04N 21/84* (2013.01); *H04N 2005/44556* (2013.01)
USPC ............................. 725/58; 725/50; 709/229

(58) Field of Classification Search
CPC .................. H04N 21/47214; H04N 5/786
USPC .......... 725/50, 53, 58, 37–49, 51, 52, 54–57, 725/59–116, 131–142; 709/229
See application file for complete search history.

(56) References Cited

U.S. PATENT DOCUMENTS 6,721,953 B1 * 4/2004 Bates et al. ..................... 725/39
6,732,570 B2 * 5/2004 Francisco, Jr. ................ 73/32 A (Continued)

FOREIGN PATENT DOCUMENTS

CN          101237559 A     8/2008
JP          2000-155764 A   6/2000

(Continued)

*Primary Examiner* — Annan Shang
(74) *Attorney, Agent, or Firm* — Birch, Stewart, Kolasch & Birch, LLP

(57) ABSTRACT

A television set (100) includes a determination section (330) and a notification section (340). The determination section (330) determines, as program information to be notified to a user, a plurality of pieces of program information each of which matches a search condition set beforehand, from among a plurality of pieces of program information. The notification section (340) notifies the user of the television set (100) of the plurality of pieces of program information thus determined by the determination section (330).

15 Claims, 23 Drawing Sheets

(56) References Cited

U.S. PATENT DOCUMENTS

| | | | |
|---|---|---|---|
| 6,832,386 B1 * | 12/2004 | Jerding et al. | 725/39 |
| 7,941,819 B2 * | 5/2011 | Stark et al. | 725/45 |
| 7,949,209 B2 * | 5/2011 | Nakase et al. | 382/305 |
| 7,962,936 B2 * | 6/2011 | Fukuda et al. | 725/43 |
| 7,970,762 B2 * | 6/2011 | Goronzy et al. | 707/732 |
| 8,245,254 B2 * | 8/2012 | Takagi | 725/45 |
| 8,281,341 B2 * | 10/2012 | Ellis et al. | 725/50 |
| 8,321,888 B2 * | 11/2012 | Epstein et al. | 725/32 |
| 8,479,233 B2 * | 7/2013 | Ellis et al. | 725/47 |
| 8,745,669 B2 * | 6/2014 | Knudson et al. | 725/58 |
| 2007/0094292 A1 | 4/2007 | Kataoka | |
| 2008/0201735 A1 | 8/2008 | Sumiyoshi et al. | |
| 2008/0244656 A1 | 10/2008 | Sumiyoshi et al. | |
| 2011/0283325 A1 * | 11/2011 | Tomita | 725/61 |

FOREIGN PATENT DOCUMENTS

| | | |
|---|---|---|
| JP | 2000-201338 A | 7/2000 |
| JP | 2002-330365 A | 11/2002 |
| JP | 2003-9033 A | 1/2003 |
| JP | 2005-79811 A | 3/2005 |
| JP | WO 2005/064928 A1 | 7/2005 |
| JP | 2005-284514 A | 10/2005 |
| JP | 2006-287855 A | 10/2006 |
| JP | 2006-311121 A | 11/2006 |
| JP | 2006-340111 A | 12/2006 |
| JP | 2007-110600 A | 4/2007 |
| JP | 2007-274164 A | 10/2007 |
| JP | 2008-187576 A | 8/2008 |
| JP | 2009-65597 A | 3/2009 |
| JP | 2010-141768 A | 6/2010 |

* cited by examiner

F I G. 3
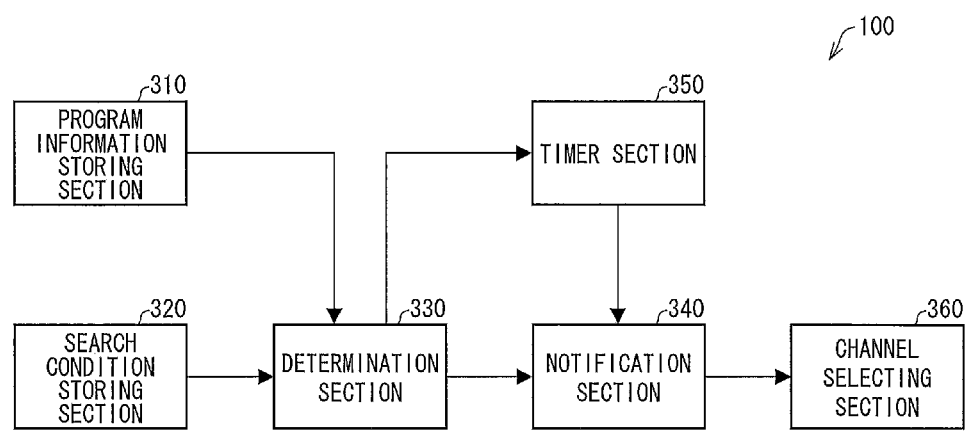

FIG. 4

| | | 320 |
|---|---|---|
| SEARCH CONDITION STORING SECTION | | |
| SEARCH CONDITION 1 | CATEGORY | NEWS/PRESS REPORT |
| SEARCH CONDITION 2 | KEYWORD | "SAKA NO UE" |
| SEARCH CONDITION 3 | ATTRIBUTE | TEXT BROADCASTING |
| ⋮ | ⋮ | ⋮ |
| SEARCH CONDITION N | ATTRIBUTE | REBROADCASTING |

FIG. 10

```
                                                                                          ┌1000
┌─────────────────────────────────────────────────────────────────────────────────────────────┐
│ LIST OF RECOMMENDED PROGRAM                                                                 │
│                                                                                             │
│                  ┌─────────────────────────────────────────────────────────────────────┐   │
│                  │ TODAY  18[SAT]  19[SUN]  20[MON]  21[TUE]  22[WED]  23[THU]  24[FRI] │   │
│ SEARCH CONDITION │                                                                     │   │
│                  │ CH  BROADCASTING STATION        PROGRAM NAME              BROADCAST DATE AND TIME │
│ ■CATEGORY        │ 1   GOVERNMENT BROADCASTING STATION   NEWS, WEATHER INFORMATION   12/17 (FRI) 11:00~11:05 │
│   NEWS/PRESS REPORT│ 7   TOKYO BROADCASTING STATION       MORNING NEWS              12/17 (FRI) 11:00~11:25 │
│ ■KEYWORD         │ 1   GOVERNMENT BROADCASTING STATION   HELLO, METROPOLITAN AREA   12/17 (FRI) 11:05~11:30 │
│   "SAKA NO UE"   │ 5   ASAHI BROADCASTING STATION       TABLOID SHOW              12/17 (FRI) 11:25~13:05 │
│ ■ATTRIBUTE       │ 1   GOVERNMENT BROADCASTING STATION   NEWS                      12/17 (FRI) 11:30~11:35 │
│   TEXT BROADCASTING│ 4   NIHON BROADCASTING STATION       NIHON BROADCASTING STATION NEWS  12/17 (FRI) 11:30~11:45 │
│   REBROADCASTING │ 8   FUJI BROADCASTING STATION        DAY NEWS                  12/17 (FRI) 11:30~12:00 │
│                  │ 1   GOVERNMENT BROADCASTING STATION   HELLO, METROPOLITAN AREA   12/17 (FRI) 11:35~11:54 │
│                  │ 1   GOVERNMENT BROADCASTING STATION   WEATHER INFORMATION       12/17 (FRI) 11:54~12:00 │
│                  │ 1   GOVERNMENT BROADCASTING STATION   NEWS                      12/17 (FRI) 12:00~12:20 │
│                  │ 1   GOVERNMENT BROADCASTING STATION   NEWS                      12/17 (FRI) 13:00~13:05 │
│                  │ 2   EDUCATIONAL BROADCASTING STATION  SIGN LANGUAGE NEWS        12/17 (FRI) 13:00~13:30 │
│        1010                                    1020                                         │
└─────────────────────────────────────────────────────────────────────────────────────────────┘
```

F I G. 1 5

```
                                                    ┌1500
┌─────────────────────────────────────────────────────┐
│        PLEASE SELECT DAY FOR AUTOMATIC NOTIFICATION.│
│                                                     │
│         SUN      ┌────────┐      NOT NOTIFY         │
│                  │ NOTIFY │                         │
│                  └────────┘                         │
│         MON       NOTIFY        ┌──────────┐        │
│                                 │ NOT NOTIFY│       │
│                                 └──────────┘        │
│         TUE       NOTIFY        ┌──────────┐        │
│                                 │ NOT NOTIFY│       │
│                                 └──────────┘        │
│         WED       NOTIFY        ┌──────────┐        │
│                                 │ NOT NOTIFY│       │
│                                 └──────────┘        │
│         THU       NOTIFY        ┌──────────┐        │
│                                 │ NOT NOTIFY│       │
│                                 └──────────┘        │
│         FRI       NOTIFY        ┌──────────┐        │
│                                 │ NOT NOTIFY│       │
│                                 └──────────┘        │
│         SAT      ┌────────┐      NOT NOTIFY         │
│                  │ NOTIFY │                         │
│                  └────────┘                         │
└─────────────────────────────────────────────────────┘
```

F I G. 1 6

```
                                                            ┌1600
  ┌─────────────────────────────────────────────────────┐
  │   PLEASE SELECT CHANNEL FOR AUTOMATIC NOTIFICATION. │
  │                                                     │
  │         CH1      ┌────────┐      NOT NOTIFY         │
  │                  │ NOTIFY │                         │
  │                  └────────┘                         │
  │         CH2        NOTIFY       ┌────────────┐      │
  │                                 │ NOT NOTIFY │      │
  │                                 └────────────┘      │
  │         CH3        NOTIFY       ┌────────────┐      │
  │                                 │ NOT NOTIFY │      │
  │                                 └────────────┘      │
  │         CH4        NOTIFY       ┌────────────┐      │
  │                                 │ NOT NOTIFY │      │
  │                                 └────────────┘      │
  │         CH5        NOTIFY       ┌────────────┐      │
  │                                 │ NOT NOTIFY │      │
  │                                 └────────────┘      │
  │         CH6        NOTIFY       ┌────────────┐      │
  │                                 │ NOT NOTIFY │      │
  │                                 └────────────┘      │
  │         CH7      ┌────────┐      NOT NOTIFY         │
  │                  │ NOTIFY │                         │
  │                  └────────┘                         │
  │                       ⋮                             │
  └─────────────────────────────────────────────────────┘
```

FIG. 22

```
                                                            ┌2200
    ┌─────────────────────────────────────────────────────────┐
    │   PLEASE SELECT CATEGORY SO AS TO SPECIFY PRIORITIES    │
    │          FOR AUTOMATIC NOTIFICATION AT STARTUP.         │
    │                                                         │
    │   1st PRIORITY :    SPORTS            [  CHANGE  ]      │
    │                                                         │
    │   2nd PRIORITY :    DRAMA             [  CHANGE  ]      │
    │                                                         │
    │   3rd PRIORITY :    NOT SPECIFIED     [  CHANGE  ]      │
    │                                                         │
    │                                                         │
    │                                                         │
    │                    [  CHANGE SETTING  ]                 │
    │                                                         │
    └─────────────────────────────────────────────────────────┘
```

PROGRAM INFORMATION NOTIFICATION DEVICE, TELEVISION RECEIVER, PROGRAM INFORMATION NOTIFICATION METHOD, PROGRAM INFORMATION NOTIFICATION PROGRAM, AND RECORDING MEDIUM

TECHNICAL FIELD

The present invention relates to a program information notification device capable of notifying a user of a plurality of pieces of program information each of which matches a search condition set beforehand, from among a plurality of pieces of program information. The present invention also relates to a television receiver and a program information notification method.

BACKGROUND ART

There are a wide variety of programs to be watched by a user on a television receiver and the like, and the number of the programs is huge. Therefore, it is extremely difficult that the user finds, by his/her own, a program to his/her taste from among such a huge number of programs. Even if the user finds a program to his/her taste, the user misses the program in some cases due to, for example, watching another program at a start of the program.

In view of this, Patent Literature 1 discloses a technique of (i) obtaining program information on a recommended program by carrying out a keyword search through program information included in EPG data in accordance with information such as a keyword inputted by a user, and (ii) notifying the user of a start of the recommended program at a time earlier than a starting time of the recommended program. This technique allows the user to recognize program information on a program which the user is likely to watch or record, without missing the program information.

Further, Patent Literature 2 discloses a technique in which, in a case where a receiving device judges that there is a program which should be notified to a user as a result of comparing (i) keyword information inputted by the user and (ii) service information that makes up a program guide and the like, the receiving device displays a message, notifying that the program is to start, on a received image before a start of the program or at startup of a television set. According to this technique, it is only necessary to input keyword information into the receiving device so as to cause the receiving device to actively notify the user of a program which the user wishes to watch.

CITATION LIST

Patent Literatures

Patent Literature 1
Japanese Patent Application Publication, Tokukai, No. 2007-274164 A
Patent Literature 2
Japanese Patent Application Publication, Tokukai, No. 2003-9033 A

SUMMARY OF INVENTION

Technical Problem

However, according to the techniques disclosed in Patent Literatures 1 and 2, it is only possible to notify the user of a single piece of program information at a certain time. Therefore, even if there are actually a plurality of programs which suit to the user's taste, only one of the plurality of programs can be notified to the user. That is, the techniques of Patent Literatures 1 and 2 have problems that, for example, in a case where (i) a first program which suits to the user's taste and (ii) a second program which more suits to the user's taste than the first program start simultaneously, the user is unaware of the second program. It follows that the user unfortunately misses the second program which more suits to the user's taste than the first program. This is because only the first program is notified to the user.

An object of the present invention is to notify a user of program information which suits to the user's taste, in a form of notification more useful to the user.

Solution to Problem

A program information notification device in accordance with the present invention includes: a determination section which determines, as program information to be notified to a user, ones of a plurality of pieces of program information each of which matches a search condition set beforehand, from among the plurality of pieces of program information; and a notification section which notifies the user of the ones of the plurality of pieces of program information thus determined.

According to the present invention, since the plurality of pieces of program information each of which matches the search condition are notified to the user, the user can recognize the plurality of pieces of program information each of which matches the search condition. This allows the user to determine and watch a program which more suits to the user's taste than the other(s) by, for example, comparing the plurality of pieces of program information. It is therefore possible to reduce risks that the user misses a program to the user's taste. That is, according to the present invention, it is possible to notify the user of program information which suits to the user's taste, in a form of notification more useful to the user.

Further, a television receiver in accordance with the present invention includes the program information notification device described above.

According to the present invention, since the plurality of pieces of program information each of which matches the search condition are notified to the user, the user can recognize the plurality of pieces of program information each of which matches the search condition. This allows the user to determine and watch a program which more suits to the user's taste then the other(s) by, for example, comparing the plurality of pieces of program information. That is, the user will never miss a program which more suits to the user's taste than the other(s). That is, according to the present invention, it is possible to notify the user of program information which suits to the user's taste, in a form of notification more useful to the user.

Further, a program information notification method in accordance with the present invention includes the steps of: determining, as program information to be notified to a user, ones of a plurality of pieces of program information each of which matches a search condition set beforehand, from among the plurality of pieces of program information; and notifying the user of the ones of the plurality of pieces of program information thus determined.

According to the present invention, since the plurality of pieces of program information each of which matches the search condition are notified to the user, the user can recognize the plurality of pieces of program information each of which matches the search condition. This allows the user to determine and watch a program which more suits to the user's taste than the other(s) by, for example, comparing the plurality of pieces of program information. It is therefore possible to reduce risks that the user misses a program to the user's taste. That is, according to the present invention, it is possible to notify the user of program information which suits to the user's taste, in a form of notification more useful to the user.

Note that the scope of the present invention encompasses (i) a program for causing a computer to function as the program information notification device and (ii) a computer-readable recording medium in which such a program is recorded.

Advantageous Effects of Invention

According to (a) a program information notification device, (b) a program information notification system, (c) a program information notification method, (d) a program information notification program, and (e) a recording medium in accordance with the present invention, a plurality of pieces of program information each of which matches a search condition set beforehand are determined as program information to be notified to a user, from among a plurality of pieces of program information. The plurality of pieces of program information thus determined are then notified to the user. Since the plurality of pieces of program information each of which matches the search condition are notified to the user, the user can recognize the plurality of pieces of program information each of which matches the search condition. This allows the user to determine and watch a program which more suits to the user's taste than the other(s) by, for example, comparing the plurality of pieces of program information.

BRIEF DESCRIPTION OF DRAWINGS

FIG. 3 is a block diagram illustrating a functional configuration of the television set 100.

FIG. 4 is a view illustrating example search conditions stored in a search condition storing section 320.

FIG. 10 is a view illustrating an example display of a program list.

FIG. 15 is a view illustrating an example display of a setting screen for narrowing days of the week on which program information is to be notified.

FIG. 16 is a view illustrating an example display of a setting screen for narrowing channels via which program information is notified.

FIG. 22 is a view illustrating an example display of a setting screen for specifying, by category, priorities of a plurality of pieces of program information.

DESCRIPTION OF EMBODIMENTS

The following description discusses a program information notification device in accordance with an embodiment of the present invention.

Embodiment 1

Summary of Television Set 100

Figure 1:
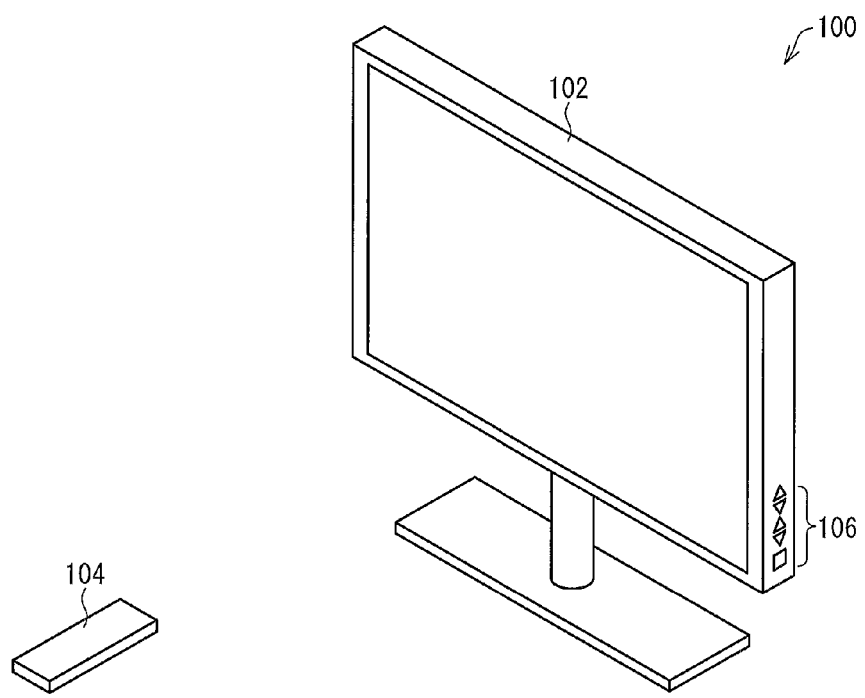
FIG. 1 is a view illustrating an appearance of a television set 100 in accordance with Embodiment 1.

First, the following description will discuss Embodiment 1 of the program information notification device in accordance with the present invention. FIG. 1 is a view illustrating an appearance of a television set 100 in accordance with Embodiment 1. The television set 100 is an example of the program information notification device which (i) extracts, from among a plurality of pieces of program information, program information which matches a search condition set beforehand and (ii) notifies a user of the program information thus extracted. According to Embodiment 1, the television set 100 is employed as the program information notification device. The television set 100 is what is called a television receiver which receives program data and then outputs a program in accordance with the received program data. That is, it can be said that the television set 100 is a television receiver including the program information notification device.

Examples of the television set 100 include (a) a liquid crystal television set, (b) a plasma television set, (c) an organic EL television set, (d) a cathode-ray-tube television set, (e) television sets with a built-in HDD (Hard Disk Drive) recorder, (f) a built-in HDD player, (g) a built-in DVD (Digital Versatile Disc) recorder, (h) a built-in DVD player, (i) a built-in BD (Blu-ray Disc) recorder, and (j) a built-in BD player. According to Embodiment 1, a liquid crystal television set which includes a BD recorder and an HDD recorder is employed as the television set 100.

The television set 100 includes a main body 102 and a remote control 104. The television set 100 further includes, as an input device, a control button 106 provided on an outside surface of the main body 102. By operating the remote control 104 or the control button 106, a user of the television set 100 can, for example, turn on or off the television set 100, control the volume, switch input, select a channel, record a program, reproduce a program, and the like.

(Program Information)

Here, program information which the television set 100 deals with will be described below. The television set 100 stores a plurality of pieces of program information. Each of the plurality of pieces of program information contains information such as a program name, program content, a channel, a start time, and a broadcast time. For example, the television set 100 acquires program information on digital terrestrial broadcasting programs or program information on satellite broadcasting programs, via a broadcasting wave or network communication, and stores, in advance, the program information thus acquired. The television set 100 mainly utilizes the plurality of pieces of program information for an electronic program guide.

The television set 100 has a program information notification function. The television set 100 also utilizes the plurality of pieces of program information when carrying out the program information notification function. The program information notification function is a function of notifying, as recommended program information, the user of program information, which matches a search condition set beforehand, from among the plurality of pieces of program information.

The user of the television set 100 carries out settings of any search conditions, such as a category, a keyword, and a program attribute, with respect to the television set 100. The television set 100 notifies, at a given timing, the user of program information which matches the search condition.

The user of the television set 100 can determine a program to watch or reconfirm a program which the user intends to watch, while referring to the program information thus notified as the recommended program information.

Note that the program information notified to the user is linked to a channel selecting function, a timer viewing function, a recording function, and the like. This allows the user of the television set 100 to (i) select a channel on which a program of the program information is broadcasted and (ii) carry out settings of timer viewing and timer recording with respect to the program, with a simple operation, while referring to the program information notified to the user.

Note here that the television set 100 notifies the user of the program information at the following timings: (1) the television set 100 first notifies the user of the program information at startup of the television set 100 (that is, at a timing at which the television set 100 is tuned on); and (2) the television set 100 also notifies, as the recommended program information, the user of the program information a predetermined time before a starting time of the program of the program information which has been determined to be notified to the user. The television set 100 of Embodiment 1 is arranged to notify the user of program information, for example, two minutes before a start time of such program of program information which is determined to be notified to the user.

Even in a case where the television set 100 is instructed, by the user via the remote control 104 or the operation button 106, to notify the user of the recommended program information, the television set 100 can notify the user of the recommended program information at timings, similar to startup of the television set 100, other than the above timings (1) and (2).

In a case where it is supposed that only a single piece of program information is notified to the user although there are a plurality of pieces of program information each of which matches the search condition set beforehand, the user can recognize only one of the plurality of pieces of program information. For example, in a case where (i) a first program which suits to the user's taste and (ii) a second program which more suits to the user's taste than the first program start simultaneously, the user is unaware of the second program. It follows that the user unfortunately misses the second program which more suits to the user's taste than the first program. This is because only the first program is notified to the user.

In view of the circumstances, the television set 100 of Embodiment 1 is configured to notify the user of the plurality of pieces of program information each of which matches the search condition set beforehand at the timings (1) and (2). With the configuration, since the plurality of pieces of program information each of which matches the search condition are notified to the user as the recommended program information, the user can recognize the plurality of pieces of program information. This allows the user to determine and watch a program which more suits to the user's taste than the other(s) by, for example, comparing the plurality of pieces of program information. That is, the user will never miss a program which more suits to the user's taste than the other(s). To put it another way, the television set 100 of Embodiment 1 can notify the user of program information which suits to the user's taste, in a form of notification more useful to the user.

(Hardware Configuration of Television Set 100)

Figure 2:
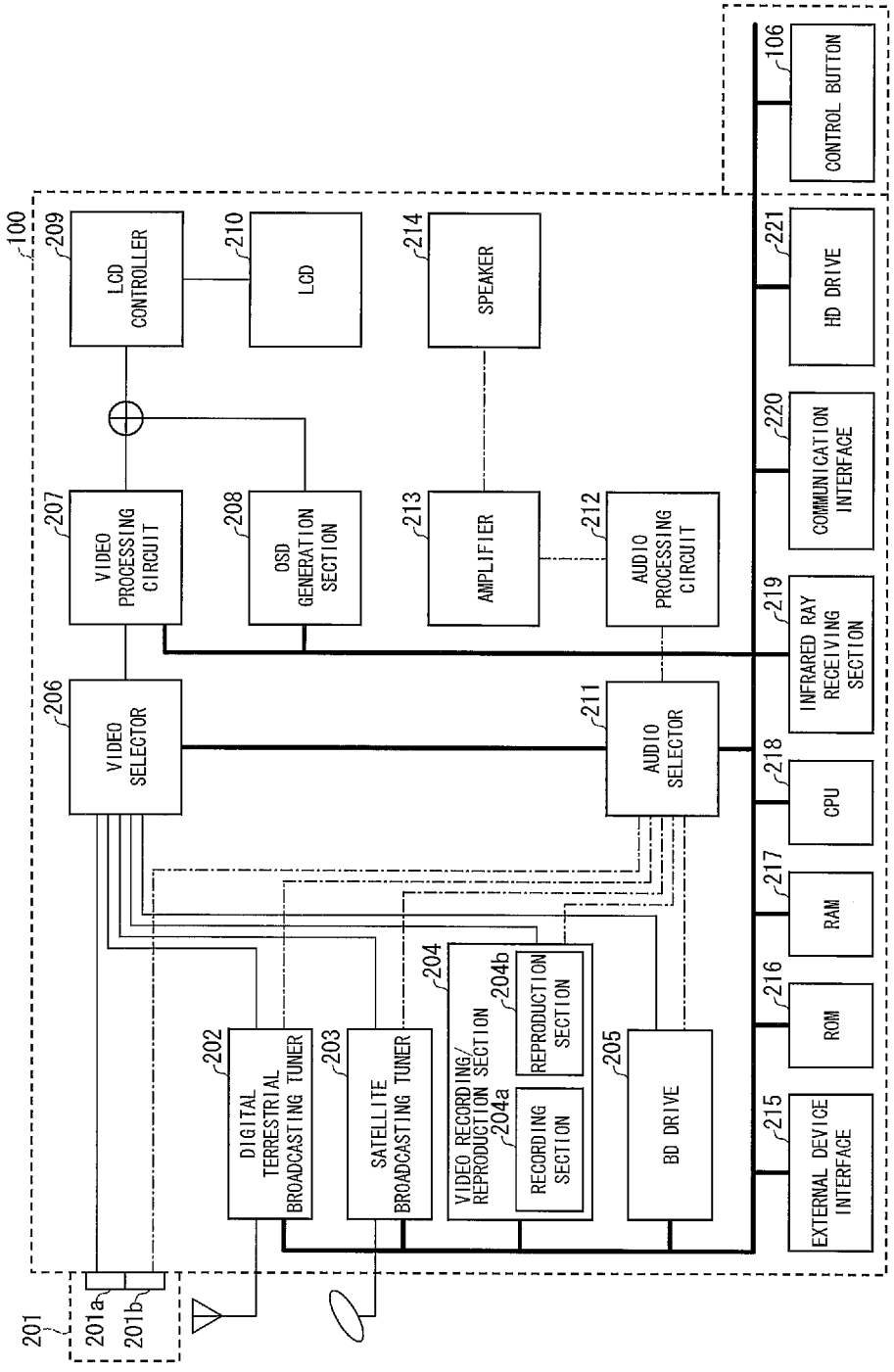
FIG. 2 is a block diagram illustrating a hardware configuration of the television set 100.

FIG. 2 is a block diagram illustrating a hardware configuration of the television set 100 (the main body 102). As illustrated in FIG. 2, the television set 100 includes an external input terminal 201, a digital terrestrial broadcasting tuner 202, a satellite broadcasting tuner 203, a video recording/reproduction section 204, a BD drive 205, a video selector 206, a video processing circuit 207, an OSD (On-Screen Display) generation section 208, an LCD (Liquid Crystal Display) controller 209, an LCD 210, an audio selector 211, an audio processing circuit 212, an amplifier 213, a speaker 214, an external device interface 215, an ROM 216, an RAM 217, a CPU 218, an infrared ray receiving section 219, a communication interface 220, and an HD drive 221. In FIG. 2, each video signal path is indicated by a solid line, each audio signal path is indicated by a dashed line, and each data path (bus) and each control signal path (bus) are indicated by heavy lines.

The external input terminal 201 is made up of a video input terminal 201a and an audio input terminal 201b. A video signal is supplied via the video input terminal 201a. Examples of the video input terminal 201a include a DVI terminal. An audio signal is supplied via the audio input terminal 201b. Examples of the audio input terminal 201b include an S/PDIF terminal. Note, however, that the external input terminal 201 is not limited to such. Examples of the external input terminal 201 include an HDMI terminal in which a video input terminal 201a and an audio input terminal 201b are integrated with each other.

The digital terrestrial broadcasting tuner 202 is a tuner for receiving a digital terrestrial broadcasting program. The digital terrestrial broadcasting tuner 202 can include an RF section for converting a received signal into an analog baseband signal, an ADC section for converting the analog baseband signal into a digital baseband signal, a demodulating section for demodulating an MPEG2 stream from the digital baseband signal, and a decoding section for decoding an video signal and an audio signal from the MPEG 2 stream.

The MPEG2 stream demodulated by the digital terrestrial broadcasting tuner 202 is supplied to the video recording/reproduction section 204 via the bus. The video signal and the audio signal, decoded by the digital terrestrial broadcasting tuner 202, are supplied to the video selector 206 and the audio selector 211, respectively. Note that the CPU 218 controls which channel the digital terrestrial broadcasting tuner 202 should select as a subject of demodulation.

Note that the digital terrestrial broadcasting tuner 202 is preferably a double-tuner capable of simultaneously demodulating two MPEG2 streams which are broadcasted via respective different channels. In this case, the digital terrestrial broadcasting tuner 202 (i) supplies, to the video recording/reproduction section 204, an MPEG2 stream which is broadcasted via a first channel selected as a channel to be selected and (ii) supplies, to the video selector 206 and the audio selector 211, a video signal and an audio signal each decoded from the MPEG2 stream, respectively. The digital terrestrial broadcasting tuner 202 further supplies, to the video recording/reproduction section 204, an MPEG2 stream which is broadcasted via a second channel selected as a channel via which a program to be recorded is broadcasted.

Note, however, that the digital terrestrial broadcasting tuner 202 is not limited to the double-tuner, and can be a single-tuner or a multiple-tuner made up of three or more tuners. In a case where the digital terrestrial broadcasting tuner 202 is a single-tuner, the digital terrestrial broadcasting tuner 202 is capable of supplying, to the video recording/reproduction section 204, an MPEG2 stream indicative of a broadcast program only in a case where the user is not watching the broadcast program. In a case where the digital terrestrial broadcasting tuner 202 is a multiple-tuner, the digital terrestrial broadcasting tuner 202 is capable of supplying, to the video recording/reproduction section 204, MPEG2 streams indicative of broadcast programs broadcasted via different channels for respective channels, respective broadcast waves, or respective viewers (for example, father, mother and children).

The satellite broadcasting tuner 203 is a tuner for receiving a satellite broadcasting program. The satellite broadcasting tuner 203 includes an RF section for converting a received signal into an analog baseband signal, an ADC section for converting the analog baseband signal into a digital baseband signal, a demodulating section for demodulating an MPEG2 stream from the digital baseband signal, and a decoding section for decoding a video signal from the MPEG 2 stream.

The MPEG2 stream demodulated by the satellite broadcasting tuner 203 is supplied to the video recording/reproduction section 204. The video signal and an audio signal, decoded by the satellite broadcasting tuner 203, are supplied to the video selector 206 and the audio selector 211, respectively. Note that the CPU 218 controls which channel the satellite broadcasting tuner 203 should select as a subject of demodulation.

Note that, as in a case of the digital terrestrial broadcasting tuner 202, the satellite broadcasting tuner 203 of Embodiment 1 is preferably a double-tuner capable of simultaneously receiving two broadcast programs which are broadcasted via respective different channels.

The video recording/reproduction section 204 includes a recording section 204a and a reproduction section 204b. The recording section 204a obtains an MPEG2 stream from either the digital terrestrial broadcasting tuner 202 or the satellite broadcasting tuner 203, and then writes the MPEG2 steam thus obtained into a recording medium. The recording section 204a can utilize, for the recording device in which an MPEG2 stream is recorded, the BD drive 205 embedded in the television set 100, the HD derive 221 embedded in the television set 100, various recorders connected to the external device interface 215, and the like. The reproduction section 204b reads out the MPEG2 stream from the recording device, and decodes a video signal and an audio signal from the MPEG2 stream thus read out. The video signal and the audio signal, decoded by the reproduction section 204b, are supplied to the video selector 206 and the audio selector 211, respectively.

The following four types of video signals are supplied to the video selector 206: (1) the video signal supplied from the external input terminal 201 (particularly, the video input terminal 201a); (2) the video signal decoded by the digital terrestrial broadcasting tuner 202; (3) the video signal decoded by the satellite broadcasting tuner 203; and (4) the video signal decoded by the video recording/reproduction section 204 (particularly, the reproduction section 204b). The video selector 206 selects any one of the video signals (1) through (4). The video signal selected by the video selector 206 is supplied to the video processing circuit 207. Note that the CPU 218 controls which video signal the video selector 206 should select.

The video processing circuit 207 carries out picture quality adjustment with respect to the video signal supplied from the video selector 206. The video processing circuit 207 carries out scaling with respect to the video signal supplied from the video selector 206. Note here that the picture quality adjustment indicates that, for example, at least one of luminance, sharpness, and contrast of video, which is represented by the video signal, is changed by, for example, processing the video signal. The scaling indicates that size of the video, which is represented by the video signal, is enlarged or reduced so as to be similarity in shape, by processing the video signal. The video signal, processed by the video processing circuit 207, is supplied to the LCD controller 209. Note that the CPU 218 controls the video processing circuit 207, as to how the video processing circuit 207 should change image quality and size.

The OSD generation section 208 generates an OSD image based on OSD data supplied from the CPU 218 (rendering). Examples of the OSD image, which the OSD generation section 208 generates, include an electronic program guide. For example, SVG (Scalable Vector Graphics) can be used as the OSD data. The OSD image, generated by the OSD generation section 208, is superimposed on the video signal supplied from the video processing circuit 207, and is then supplied to the LCD controller 209.

The LCD controller 209 drives, in accordance with the video signal supplied from the video processing circuit 207, the LCD 210 so that the video represented by the video signal is displayed. In a case where the OSD image is supplied from the OSD generation section 208 to the LCD controller 209, the LCD controller 209 drives, in accordance with the video signal which is supplied from the video processing circuit 207 and which is superimposed by the OSD image, the LCD 210 so that the video represented by the video signal is displayed. Note that Embodiment 1 takes an example in which a liquid crystal television set is employed as the television set 100. Accordingly, the television set 100 employs the LCD 210 as a display, and the LCD controller 209 is employed as a display controller. Therefore, in a case where a television set other than a liquid crystal television set is employed, a display and a display controller according to the television set are employed.

The audio selector 211 receives the foregoing four types of audio signals. That is, the audio selector 211 receives (1) the audio signal supplied via the external input terminal 201 (particularly, the audio input terminal 201b), (2) the audio signal decoded by the digital terrestrial broadcasting tuner 202, (3) the audio signal decoded by the satellite broadcasting tuner 203, and (4) the audio signal decoded by the video recording/reproduction section 204 (particularly, the reproduction section 204b). The audio selector 211 selects any one of the audio signals (1) through (4).

The audio signal selected by the audio selector 211 is supplied to the audio processing circuit 212. Note that the CPU 218 controls the audio selector 211, as to which audio signal the audio selector 211 should select. Note, however, that (i) the selection of video made by the video selector 206 and (ii) the selection of audio made by the audio selector 211 are interlocked with each other. For example, while the video selector 206 is selecting the video signal supplied from the digital terrestrial broadcasting tuner 202, the audio selector 211 selects the audio signal supplied from the digital terrestrial broadcasting tuner 202.

The audio processing circuit 212 carries out volume control with respect to the audio signal supplied from the audio selector 211. The audio processing circuit 212 also carries out tone control with respect to the audio signal supplied from the audio selector 211. Note here that the volume control indicates that volume of audio, which is represented by the audio signal, is changed by processing the audio signal. The tone control indicates that a frequency characteristic of the audio, which is represented by the audio signal, is changed by processing the audio signal. Examples of the tone control encompass enhancement of a low frequency of the audio and enhancement of a high frequency of the audio. The audio signal, processed by the audio processing circuit 212, is supplied to the amplifier 213. Note that the CPU 218 controls the audio processing circuit 212, as to how the audio processing circuit 212 should change volume control and tone control.

The amplifier 213 drives the speaker 214 so that the audio, represented by the audio signal, is outputted in accordance with the audio signal supplied from the audio processing circuit 212.

The CPU 218 controls each section of the television set 100 in accordance with a control signal supplied to the television set 100. Examples of such a control signal include a control signal entered via the operation button 106, a control signal which is transmitted from the remote control 104 and is then received by the infrared ray receiving section 219, a control signal transmitted from an external device via the external device interface 215, and a control signal transmitted from network equipment via the communication interface 220.

Examples of the control, carried out by the CPU 218 in accordance with the control signal, include (i) control in which receiving channels of the digital terrestrial broadcasting tuner 202 and the satellite broadcasting tuner 203 are switched, (ii) control in which the video signal and the audio signal, which are respectively selected by the video selector 206 and the audio selector 211, are controlled in accordance with a remote control signal, (iii) control in which the video recording section 204a is caused to carry out recording of contents, and (iv) control in which the video reproduction section 204b is caused to carry out reproduction of contents.

The ROM 216 is a readable but not rewritable memory in which fixed data, such as programs to be executed by the CPU 218, is stored. On the other hand, the RAM 217 is a readable and rewritable memory in which variable data is stored. Examples of variable data encompass data to be referred to by the CPU 218 during calculation and data generated by the CPU 218 during calculation.

The external device interface 215 is an interface for connecting an external device to the television set 100. Examples of the external device interface 215 include HDMI and iLink.

The communication interface 220 is an interface for connecting the television set 100 to a network or various pieces of network equipment. Examples of the communication interface 220 include a LAN interface.

Note that Embodiment 1 is based on the premise that a system, in which an MPEG2 stream is multiplexed (ATSC system in America or ISDB-T system in Japan), is employed as the digital terrestrial broadcasting system. Note, however, that Embodiment 1 is not limited to such. That is, for example, the present invention is applicable to digital terrestrial broadcasting system in which an MPEG4 stream or the like is multiplexed (DVB-T/DVB-T2 system in Europe, etc.), instead of the system in which an MPEG2 stream is multiplexed. In the latter case, a configuration can be employed in which a demodulated MPEG4 stream is recorded, as it is, in the recording device or a configuration in which a demodulated MPEG4 stream is converted into an MPEG2 stream and is then recorded in the recording device.

(Functions of Television Set 100)

A functional configuration of the television set 100 is described here. FIG. 3 is a block diagram illustrating a functional configuration of the television set 100. As illustrated in FIG. 3, the television set 100 includes a program information storing section 310, a search condition storing section 320, a determination section 330, a notification section 340, a timer section 350, and a channel selecting section 360. Here, (i) the program information notification function of the television set 100 and (ii) functions related to the program information notification function will be described. No drawing and description of the other functions will be given because the other functions are general functions of a television receiver.

The program information storing section 310 stores a plurality of pieces of program information. For example, the television set 100 receives a broadcast wave containing digital terrestrial broadcasting program information via the digital terrestrial broadcasting tuner 202. The television set 100 also receives a broadcast wave including satellite broadcasting program information via the satellite broadcasting tuner 203. The television set 100 extracts the program information contained in received broadcast waves, and then stores extracted program information in the program information storing section 310. The television set 100 regularly acquires latest program information and stores the latest program information in the program information storing section 310. For example, according to the television set 100, the ROM 216, the RAM 217 and the like (see FIG. 2) function as the program information storing section 310.

The search condition storing section 320 stores a search condition used to search for, from among the plurality of pieces of program information stored in the program information storing section 310, program information to be notified to the user. In the search condition storing section 320, an optional search condition set by the user is stored beforehand. Examples of the search condition include a category, a keyword, and a program attribute. For example, according to the television set 100, the ROM 216, the RAM 217 and the like (see FIG. 2) function as the search condition storing section 320.

From among the plurality of pieces of program information stored in the program information storing section 310, the determination section 330 determines, as the program information to be notified to the user, a plurality of pieces of program information each of which matches the search condition stored in the search condition storing section 320. Specifically, each of the plurality of pieces of program information stored in the program information storing section 310 contains information such as a category, program contents, and a program attribute. In accordance with such information, the determination section 330 determines, as the program information to be notified to the user, (i) program information in which a category identical to one set in the search condition is set, (ii) program information in which a keyword set in the search condition is contained in program contents, and (iii) program information in which a program attribute identical to one set in the search condition is set. For example, according to the television set 100, the CPU 218 (see FIG. 2) functions as the determination section 330.

The notification section 340 notifies the user of the plurality of pieces of program information determined by the determination section 330. Specifically, the notification section 330 notifies the user of the plurality of pieces of program information, which are determined by the determination section 340, by causing the LCD 210 to display them. The notification section 340 can notify the user of the plurality of pieces of program information, by use of some sort of sound. For example, the notification section 340 can be arranged to carry out a process in which program information is of read out so that the speaker 214 is caused to produce sound indicative of contents of the program information. For example, according to the television set 100, the CPU 218 (see FIG. 2) functions as the notification section 340 by controlling the video processing circuit 207 and the audio processing circuit 212.

The timer section 350 determines a timing at which the plurality of pieces of program information is notified to the user. For example, in a case where it is determined that a piece of program information should be notified to a user, the timer section 350 sets a notification time of such a piece of program information to a predetermined time before a start time of the program information. For example, the timer section 350 sets a notification time of such a piece of program information to two minutes before a start time of the program information. At set notification time, the timer section 350 supplies the notification section 340 with some sort of trigger information. Upon receipt of the trigger information, the notification section 340 starts a notification process of the program information. For example, according to the television set 100, the CPU 218 (see FIG. 2) functions as the timer section 350.

The channel selecting section 360 makes a channel selection. Examples of the channel selection include (i) switching of receiving channels of the digital terrestrial broadcasting tuner 202 and the satellite broadcasting tuner 203 and (ii) switching of video signals and audio signals to be selected by the video selector 206 and the audio selector 211, respectively. The channel selecting section 360 normally makes the channel selection in accordance with (i) a control signal supplied via the operation button 106 or (ii) a control signal which is transmitted from the remote control 104 and is received by the infrared ray receiving section 219. For example, according to the television set 100, the CPU 218 (see FIG. 2) functions as the channel selection section 302. Specifically, according to the television set 100, the CPU 218 (see FIG. 2) functions as the channel selection section 360 by controlling the digital terrestrial broadcasting tuner 202 and the satellite broadcasting tuner 203.

(Search Condition)

The following description will discuss specific examples of the search condition stored in the search condition storing section 320. FIG. 4 is a view illustrating example search conditions stored in the search condition storing section 320. As illustrated in FIG. 4, the search condition storing section 320 stores a plurality of (N items, N is an integer) search conditions. The plurality of search conditions are used in a case where the determination section 330 determines the program information to be notified to the user.

For example, a category of "news/press report" is set in a search condition 1. The determination section 330 determines, in accordance with the search condition 1, program information in which a category of "news/press report" is set, as the program information to be notified to the user.

As illustrated in FIG. 4, the plurality of search conditions are stored in the search condition storing section 320. The determination section 330 determines, as the program information to be notified to the user, program information which matches any of the plurality of search conditions. That is, the determination section 330 determines the program information to be notified to the user by conducting an OR search under the plurality of search conditions.

Note that the determination section 330 can determine the program information to be notified to the user by conducting an AND search under the plurality of search conditions. Alternatively, the user can determine whether the determination section 330 conducts an AND search or an OR search under the plurality of search conditions.

As to how to set the search conditions, the user can set individual search condition so as to set any combination of the search conditions set by the user (see FIG. 4). Alternatively, the user ran select any of a plurality of combinations of search conditions which are stored, in advance, in the television set 100.

(Program Information)

Figure 5:
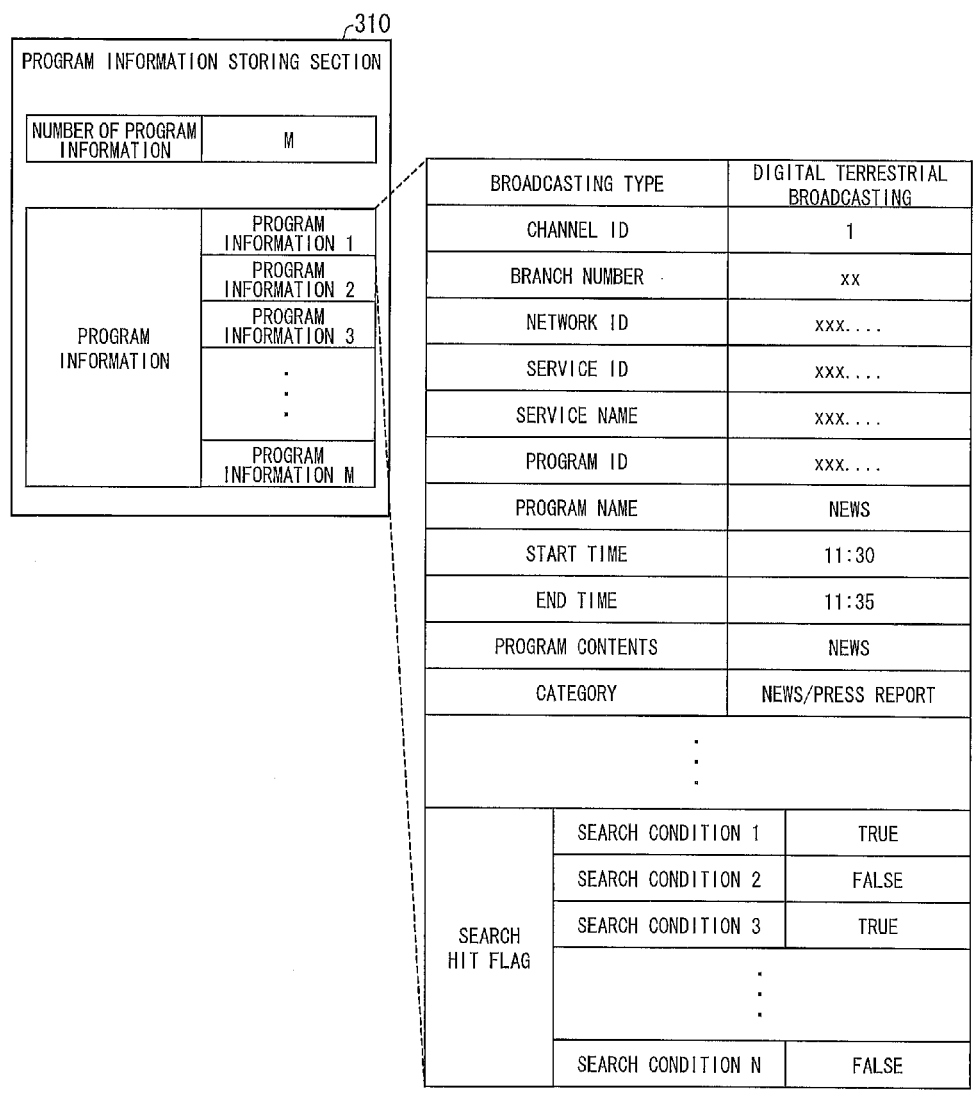
FIG. 5 is a view illustrating example program information stored in a program information storing section 310.

The following description will discuss specific examples of the plurality of pieces of program information stored in the program information storing section 310. FIG. 5 is a view illustrating example program information stored in the program information storing section 310. As illustrated in FIG. 5, the program information storing section 310 stores a plurality of (M items, M is an integer) pieces of program information. From among the plurality of pieces of program information, the determination section 330 determines, as the program information to be notified to the user, program information which matches the search condition set beforehand.

Each of the plurality of pieces of program information contains various pieces of information on a program of the each of the plurality of pieces of program information. For example, according to the example in FIG. 5, each of the plurality of pieces of program information contains various pieces of information on a program of the each of the plurality of pieces of program information, such as a broadcasting type, a channel ID, a branch number, a network ID, a service name, an event ID, a program name, a start time, an end time, program contents, and a category.

The various pieces of information are (i) information to be actually notified to the user by the electronic program guide or the program information notification function, (ii) information to be internally used by the television set 100, or (iii) information to be referred to by the determination section 330 during a search.

As illustrated in FIG. 5, search hit flags are set in each of the plurality of pieces of program information. Note that the search hit flag indicates whether or not each of the plurality of pieces of program information matches the search condition stored in the search condition storing section 320. Specifically, (i) "TRUE" indicating that each of the plurality of pieces of program information matches a corresponding search condition stored in the search condition storing section 320 and (ii) "FALSE" indicating that the each of the plurality of pieces of program information does not match the corresponding search condition stored in the search condition storing section 320, are set in the search hit flag.

For example, according to the example in FIG. 5, each of the "search condition 1" and a "search condition 3" is set to "TRUE" as to "program information 1." This means that the "program information 1" matches the "search condition 1" and the "search condition 3" illustrated in FIG. 4.

Each setting of "TRUE" and "FALSE" for each of the plurality of search conditions is carried out by the determination section 330.

For example, in a case where a "search condition N" is newly set by the user, the determination section 330 determines program information which matches the "search condition N", from among the plurality of pieces of program information stored in the program information storing section 310. At this time, the determination section 330 sets, to "TRUE," the "search condition N" in a "search hit flag" section of program information which matches the "search condition N". On contrary, the determination section 330 sets, to "FALSE," the "search condition N" in the "search hit flag" section of program information which does not match the "search condition N".

Once the determination section 330 thus conducts a search, it is possible to determine whether or not each of the plurality of pieces program information matches the search condition, that is, whether or not each of the plurality of pieces of program information should be notified to the user. This enables the notification section 340 to recognize the program information to be notified to the user by merely referring to the "search hit flag" section of each of the plurality of pieces of program information, without causing the determination section 330 to carry out searches over and over.

Note that a setting value in the "search hit flag" section indicates a result of a search under a search condition at a time of the search. In a case where a search condition is added, changed, or deleted, the setting value in the "search hit flag" section is updated accordingly. This causes the setting value in the "search hit flag" section to indicate a result of a search under a latest search condition.

(Steps of Program Information Notification Process at Startup of Television Set 100)

Figure 6:
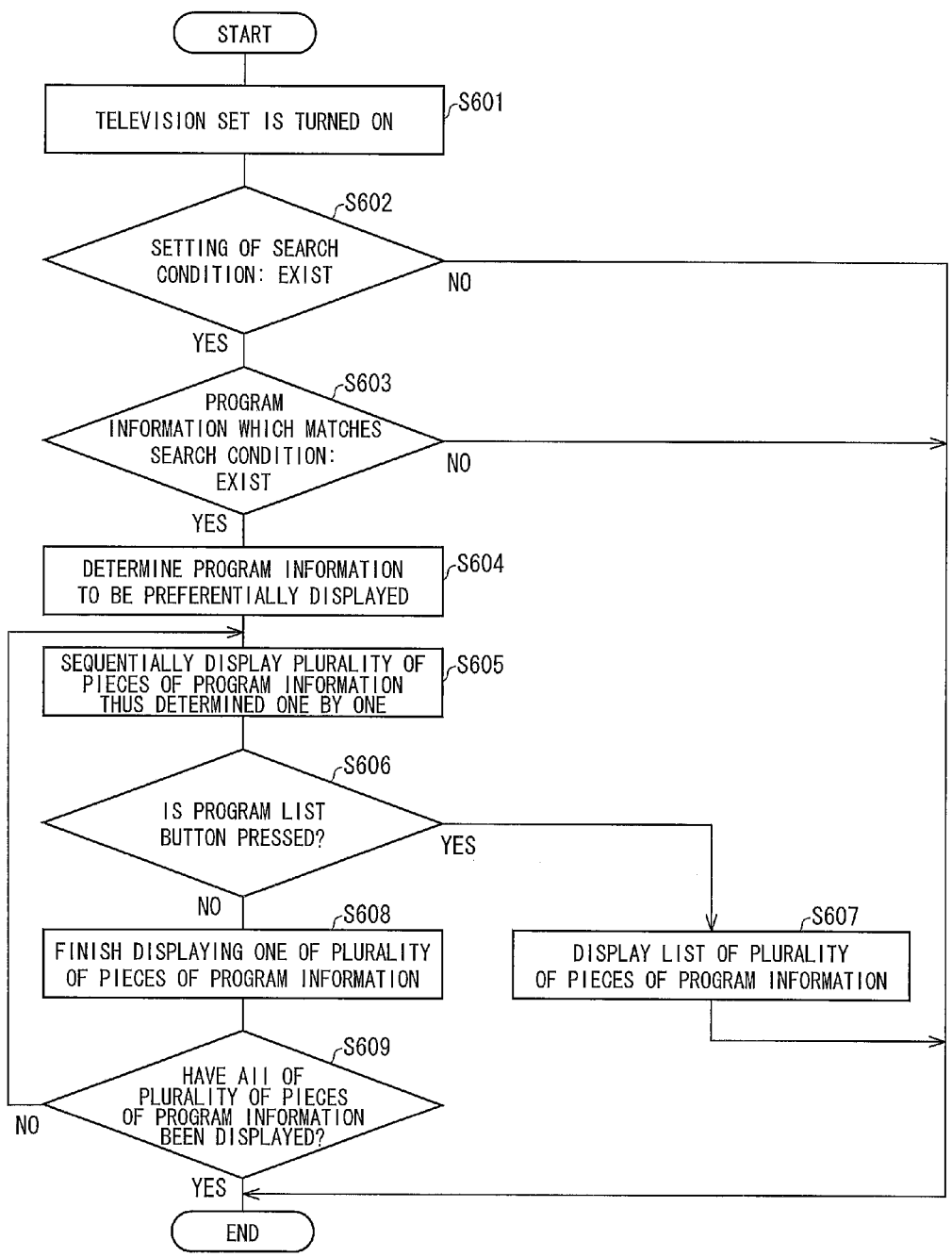
FIG. 6 is a flowchart illustrating how the television set 100 carries out a program information notification process.

The following description will discuss steps of a program information notification process carried out by the television set 100. FIG. 6 is a flowchart illustrating how the television set 100 carries out a program information notification process. As has been described, the television set 100 carries out the program information notification process (1) at startup of the television set 100 and (2) at a start of a program. The steps of the program information notification process (1) at startup of the television set 100 will be described here. Note that, as illustrated in FIGS. 4 and 5, the following description will be on the premise that a search condition is stored in the search condition storing section 320, a plurality of pieces of program information are stored in the program information storing section 310, and determination has made by the determination section 330 as to whether or not each of the plurality of pieces of program information matches a corresponding search condition.

When the television set 100 is turned on (step S601), the notification section 340 judges whether or not a search condition is set for the television set 100 (step S602). For example, the notification section 340 can judge that a search condition is set for the television set 100, in a case where even one search condition is stored in the search condition storing section 320. On the other hand, the notification section 340 can judge that no search condition is set for the television set 100, in a case where no search condition is stored in the search condition storing section 320.

In a case where the notification section 340 judges that "no search condition is set" (No, in the step S602) in the step S602, the television set 100 terminates the program information notification process because no recommended program information can be determined. In contrast, in a case where the notification section 340 judges that "a search condition is set" (Yes, in the step S602) in the step S602, the notification section 340 judges whether or not there is program information which matches the search condition (step S603).

For example, the notification section 340 can judge that "there is program information which matches the search condition," in a case where the "search hit flag" section of any of the plurality of pieces of program information stored in the program information storing section 310 is set to "TRUE". On the other hand, the notification section 340 can judge that "there is no program information which matches the search condition," in a case where the "search hit flag" section of any of the plurality of pieces of program information stored in the program information storing section 310 is not set to "TRUE".

In a case where the notification section 340 judges that "there is no program information which matches the search condition" (No, in the step S603) in the step S603, the television set 100 terminates the program information notification process because there is no recommended program information. On the other hand, in a case where the notification section 340 judges that "there is program information which matches the search condition" (Yes, in the step S603) in the step S603, the television set 100 proceeds to step S604.

In the step S604, the notification section 340 determines program information to be preferentially displayed, from among a plurality of pieces of program information each of which matches the search condition (step S604). This is because it is not preferable to display all of the plurality of pieces of program information in a case where the number of the plurality of pieces of program information is considerable. According to Embodiment 1, from among the plurality of pieces of program information each of which matches the search condition, the notification section 340 determines, as the program information to be preferentially displayed, ten pieces of program information in total, in order of start time, i.e., (i) first five pieces of program information each containing a broadcast date which is a current day and (ii) first five pieces of program information each containing a broadcast date which is the following day.

For example, it is assumed that a system date and time at which the television set 100 is turned on is 11:00, Friday, December 17. The notification section 340 determines, as the program information to be preferentially displayed, first five pieces of program information in order of start time, from among a plurality of pieces of program information in each of which a broadcast date is set to Friday, December 17 and a start time is set in a time period ranging from 11:00 to 24:00. Furthermore, the notification section 340 determines, as the program to be preferentially displayed, first five pieces of program information in order of start time, from among a plurality of pieces of program information in each of which a broadcast date is set to Saturday, December 18 and a start time is set in a time period ranging from 0:00 to 24:00.

After the program information to be preferentially displayed is thus determined, the notification section 340 sequentially displays the plurality of pieces of program information thus determined one by one (step S605). Specifically, a program information notification window is displayed by the notification section 340 so as to be superimposed on an image that is currently displayed. The notification section 340 sequentially displays, on the program information notification window, the plurality of pieces of program information thus determined, while scrolling the plurality of pieces of program information one by one. Particularly, according to Embodiment 1, the notification section 340 sequentially displays, in order of start time, the plurality of pieces of program information thus determined.

Note here that, as described later with reference to FIG. 7, the notification section 340 displays, on the program information notification window, a "program list" button together with a plurality of pieces of program information to be recommended. The television set 100 monitors whether or not the "program list" button is pressed while the plurality of pieces of program information are being displayed (step S606). In a case where the "program list" button is pressed while the plurality of pieces of program information are being displayed (Yes, in the step S606), the television set 100 displays a list of the plurality of pieces of program information which match the search condition (step S607), and then terminates the program information notification process. In a case where the "program list" button is not pressed while the plurality of pieces of program information are being displayed (No, in the step S606), the notification section 340 continues to display the plurality of pieces of program information.

Thereafter, when a display of one of the plurality of pieces of program information is finished (step S608), the notification section 340 judges whether or not all of the plurality of pieces of program information, which are determined in the step S604, have been displayed (step S609). In a case where the notification section 340 judges, in the step S609, that "all of the plurality of pieces of program information thus determined have been displayed" (Yes, in the step S609), the television set 100 terminates the program information notification process. In a case where the notification section 340 judges, in the step S609, that "all of the plurality of pieces of program information have not been displayed" (No, in the step S609), the television set 100 repeats the steps S605 through S609 until all of the plurality of pieces of program information thus determined have been displayed.

In this manner, the television set 100 determines, from among a plurality of pieces of program information each of which matches a search condition, program information to be preferentially displayed. The television set 100 sequentially displays a plurality of pieces of program information thus determined one by one. The television set 100 then displays a list of the plurality of pieces of program information each of which matches the search condition in a case where the "program list" button is pressed while the plurality of pieces of program information are being displayed.

(Example Display of Program Information at Startup of Television Set)

The following description will discuss an example display of program information at startup of a television set. FIG. 7 is a view illustrating an example display of program information at startup of a television set. A screen 700 illustrated in FIG. 7 is a screen displayed on the LCD 210 of the television set 100. A program information notification window 710 is displayed so as to be superimposed on an image that is currently displayed.

The program information notification window 710 has a title display area 712 and a program information display area 714. According to Embodiment 1, "today's and tomorrow's recommended programs" is displayed on the title display area 712. Program information to be notified, as the recommended program information, to the user is displayed on the program information display area 714. The notification section 340 sequentially displays a plurality of pieces of program information on the program information display area 714, while scrolling the plurality of pieces of program information one by one.

A "program list" button 716 and operating instruction 718 are also displayed on the program information notification window 710. As has been described, the television set 100 (i) displays, on the program information display area 714, a part of the plurality of pieces of program information each of which matches a search condition, and (ii) displays a list of the plurality of pieces of program information each of which matches the search condition when the "program list" button 716 is pressed while the plurality of pieces of program information are being displayed on the program information display area 714.

The operating instruction 718 shows how an operation, which can be conducted with respect to the program information notification window 710, can be conducted by use of the remote controller 104. For example, according to an example illustrated in FIG. 7, the operating instruction 718 shows that (i) a next piece of program information can be displayed by pressing a down button of the remote control 104 and (ii) the program information notification process can be terminated by pressing a "return" button of the remote control 104.

Figure 7:
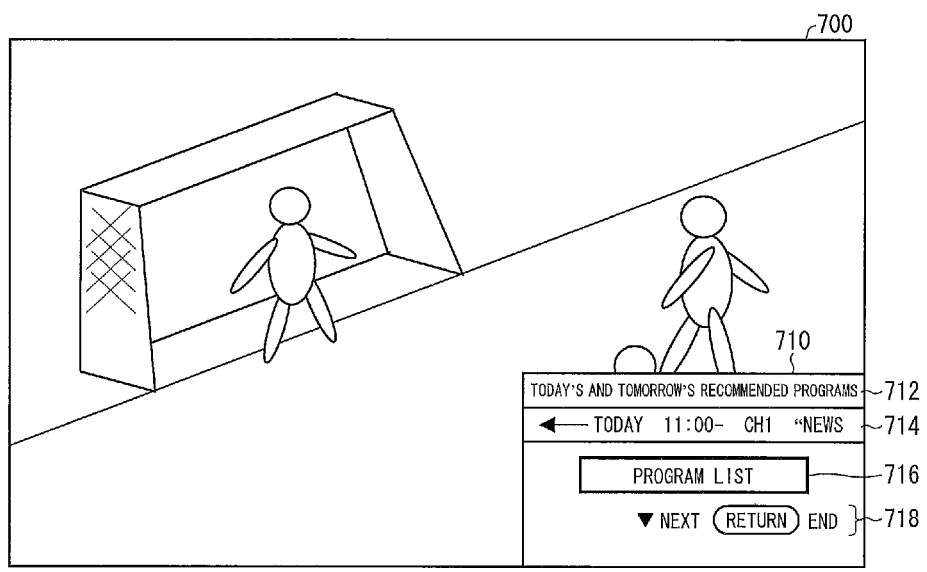
FIG. 7 is a view illustrating an example display of program information at startup of a television set.

Note that the television set 100 is capable of displaying the plurality of pieces of program information as illustrated in FIG. 7, irrespective of contents that have been displayed on a screen at the startup of the television set 100. For example, the television set 100 is capable of displaying the plurality of pieces of program information as illustrated in FIG. 7, irrespective of broadcasting types (digital terrestrial/BS/CS etc.) at startup of the television set 100. Note also that the television set 100 is capable of displaying the plurality of pieces of program information as illustrated in FIG. 7, even if an externally supplied display is being carried out at startup of the television set 100.

Note that, according to the example in FIG. 7, not only the plurality of pieces of program information, but also the "program list" button 716 and the operating instruction 718 are displayed on the program information notification window 710. Note, however, that information useful to the user, such as the number of the plurality of pieces of program information to be displayed and/or what number of the plurality of pieces of program information is currently displayed, may be further displayed on the program information notification window 710.

(Display Order of Program Information)

Figure 8:
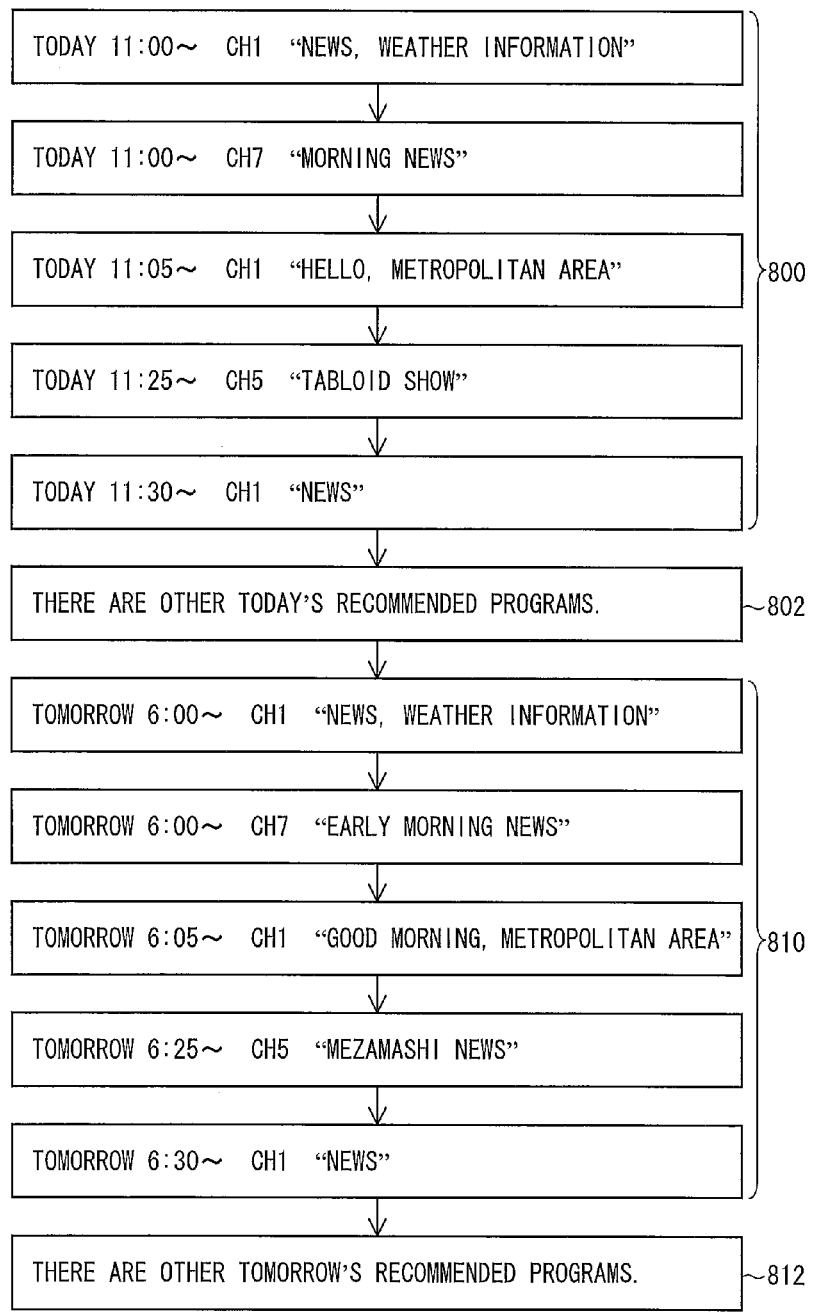
FIG. 8 is a view illustrating an order in which pieces of program information are displayed.

The following description will discuss a display order of pieces of program information. FIG. 8 is a view illustrating an order in which pieces of program information are displayed. Note that a program information group 800 and a program information group 810, illustrated in FIG. 8, are program information groups which are determined by the notification section 340 to be preferentially displayed. Specifically, from among a plurality of pieces of program information each of which matches a search condition, the program information group 800 includes first five pieces of program information in order of start time, each of which contains a broadcast date which is the current day. On the other hand, the program information group 810 includes first five pieces of program information in order of start time, each of which contains a broadcast date which is the following day.

As illustrated in FIG. 8, the notification section 340 first displays, one by one in order of start time, the five pieces of program information each containing a broadcast date which is the current day. The notification section 340 then displays a message 802 of "there are other today's recommended programs," in a case where there are six or more pieces of program information each containing a broadcast date which is the current day (see FIG. 8). The notification section 340 thus prompts the user to check program information other than the first five pieces of program information in the list of the plurality of pieces of program information.

The notification section 340 then displays, one by one in order of start time, the five pieces of program information each containing a broadcast date which is the following day. Similarly, the notification section 340 displays a message 812 of "there are other tomorrow's recommended programs" in a case where there are six or more pieces of program information each containing a broadcast date which is the following day (see FIG. 8). The notification section 340 thus prompts the user to check program information other than the five pieces of program information in the list of the plurality of pieces of program information.

Note here that, as described above, the notification section 340 displays, one by one in order of start time, a plurality of pieces of program information. Specifically, after the notification section 340 finishes displaying one of the plurality of pieces of program information, the notification section 340 starts displaying next one of the plurality of pieces of program information. Note here that a timing, at which one of the plurality of pieces of program information finishes displaying, is not limited to a specific one. For example, the notification section 340 can be arranged such that a display time per one (1) piece of program information is preset and the notification section 340 keeps displaying text information of the one piece of program information until the display time has elapsed. Alternatively, the notification section 340 can be arranged to finish displaying one (1) piece of program information when the notification section 340 finishes scrolling the last character of the one (1) piece of program information, in a case where the notification section 340 displays the plurality of pieces of program information while scrolling them. Alternatively, the notification section 340 can be arranged such that a display time per one (1) piece of program information is preset and the notification section 340 keeps displaying text information of the one piece of program information while scrolling it until the display time has elapsed. Alternatively, the notification section 340 can be arranged to keep displaying text information of one (1) piece of program information until the user operates the notification section 340 so as to display next text information.

Note that, according to Embodiment 1, the television set 100 displays a "start time", a "CH (channel)", and a "program name" of each of the plurality of pieces of program information (see FIG. 8). However, contents of each of the plurality of pieces of program information to be displayed are not limited to such.

Note that, in the above example, the television set 100 displays five pieces of program information every time the television set 100 is turned on. Alternatively, the number of notification of program information can be limited. Alternatively, the number of program information to be displayed can be varied according to the number of startup of the television set 100. For example, the television set 100 can be arranged to notify the user of program information only at the first startup of the television set 100 every day (that is, once a day). Alternatively, the television set 100 can be arranged to display five pieces of program information at the first startup of the television set 100 every day, and display only one (1) piece of program information at and after the second startup of the television set 100 that day. Alternatively, the television set 100 can be arranged such that the user sets, as appropriate, the number of notification and the number of program information to be displayed. In the above example, the television set 100 displays the plurality of pieces of program information of the current day and the following day. Alternatively, the television set 100 can be arranged to display (i) only program information of the current day or (ii) program information of the current week.

(Steps of Displaying Plurality of Pieces of Program Information)

Figure 9:
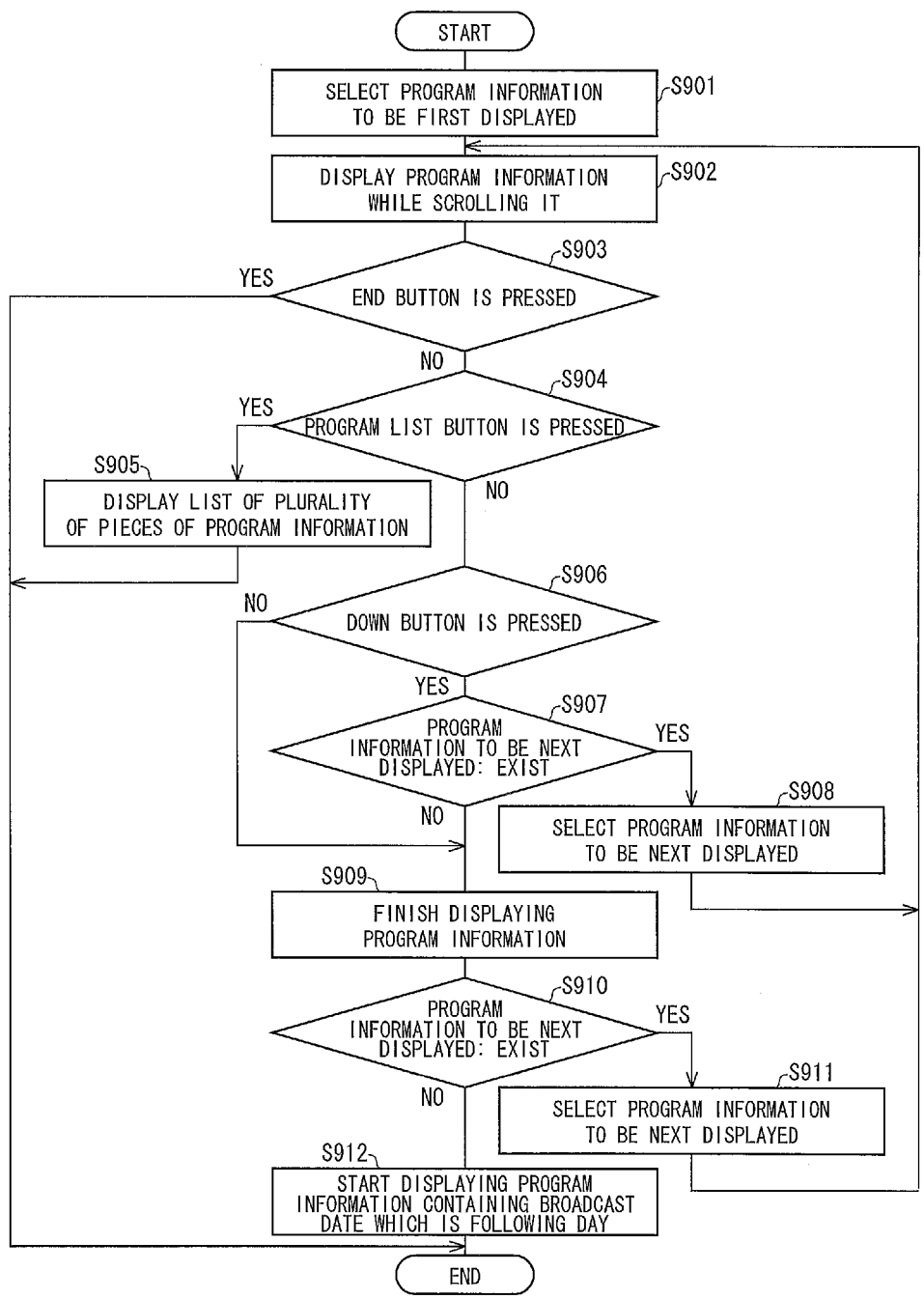
FIG. 9 is a flowchart specifically illustrating how the television set 100 displays a plurality of pieces of program information.

The following description will more specifically discuss how the television set 100 displays the plurality of pieces of program information. FIG. 9 is a flowchart specifically illustrating how the television set 100 displays a plurality of pieces of program information. Note here that the following description will assume that a plurality of pieces of program information to be preferentially displayed have been already determined.

First, the notification section 340 carries out the following steps S901 through 911 so as to display a plurality of pieces of program information each containing a broadcast date which is the current day.

First, the notification section 340 selects program information to be first displayed, from among the plurality of pieces of program information, which are determined to be preferentially displayed and each of which contains a broadcast date which is the current day (step S901). The notification section 340 then displays the program information thus selected while scrolling the program information (step S902).

Here, the television set 100 monitors whether or not an "end" button of the remote control 104 is pressed while the program information is being displayed (step S903). In a case where the "end" button is pressed while the program information is being displayed (Yes, in the step S903), the television set 100 terminates the program information notification process. In a case where the "end" button is not pressed while the program information is being displayed (No, in the step S903), the television set 100 continues to display the program information.

As illustrated in FIG. 7, the notification section 340 displays, on the program information notification window, the "program list" button together with the plurality of pieces of program information to be recommended. The television set 100 monitors whether or not the "program list" button is pressed while the program information is being displayed (step S904). In a case where the "program list" button is pressed while the program information is being displayed (Yes, in the step S904), the television set 100 displays a list of the plurality of pieces of program information each containing a broadcast date which is the current day, among the plurality of pieces of program information each of which matches the search condition (step S905). The television set 100 then terminates the program information notification process. In a case where the "program list" button is not pressed while the program information is being displayed (No, in the step S904), the television set 100 continues to display the program information.

The television set 100 further monitors whether or not the down button of the remote control 104 is pressed while the program information is being displayed (step S906). In a case where the down button is pressed while the program information is being displayed (Yes, in the step S906), the notification section 340 judges whether or not there is program information to be next displayed (step S907). In a case where the notification section 340 judges that "there is program information to be next displayed" (Yes, in the step S907), the notification section 340 selects the program information to be next displayed, from among the plurality of pieces of program information, which are determined to be preferentially displayed and each of which contains a broadcast date which is the current day (step S908). The notification section 340 then returns to the step S902 so as to display the program information thus selected while scrolling the program information (step S902).

On the other hand, in a case where the down button is not pressed while the program information is being displayed (No, in the step S906), the television set 100 continues to display the program information. Further, in a case where the notification section 340 judges, in the step S907, that "there is no program information to be next displayed" (NO, in the step S907), the television set 100 continues to display the program information as well.

Thereafter, when the notification section 340 finishes displaying the program information, which is displayed in the step S902 (step S909), the notification section 340 judges whether or not there is program information to be next displayed (step S910). In a case where the notification section 340 judges that "there is program information to be next displayed" (Yes, in the step S910), the notification section 340 selects the program information to be next displayed, from among the plurality of pieces of program information, which are determined to be preferentially displayed and each of which contains a broadcast date which is the current day (step S911). The notification section 340 then returns to the step S902 so as to display the program information thus selected while scrolling the program information (step S902). In a case where the notification section 340 judges, in the step S910, that "there is no program information to be next displayed" (No, in the step S910), the notification section 340 finishes displaying the plurality of pieces of program information each containing a broadcast date which is the current day. This is because the notification section 340 has displayed all of the plurality of pieces of program information to be displayed. The notification section 340 then starts displaying a plurality of pieces of program information each containing a broadcast date which is the following day (step S912). In a case where there is program information other than the plurality of pieces of program information to be preferentially displayed, the notification section 340 can display a message such as the message 802 ("there are other today's recommended programs") illustrated in FIG. 8.

Display of the plurality of pieces of program information each containing a broadcast date which is the following day is carried out through steps similar to the steps of displaying the plurality of pieces of program information each containing a broadcast date which is the current day (step S901 through step S911). Therefore, its description will not be given. After the notification section 340 finishes displaying the plurality of pieces of program information each containing a broadcast which is the following day, the television set 100 terminates the program information notification process.

(Example Display of Program List)

The following description will discuss an example display of a program list. FIG. 10 is a view illustrating an example display of a program list. A program list display screen 1000 illustrated in FIG. 10 is a screen displayed on the LCD 210 of the television set 100. The program list display screen 1000 is displayed while being superimposed on or instead of an image that is currently broadcasted.

The program list display screen 1000 has a search condition display area 1010 and a program list display area 1020. A search condition, used to search for recommended program information, is displayed on the search condition display area 1010. A list of the recommended program information, which matches the search condition, is displayed on the program list display area 1020.

Note here that a tag is displayed, for each day after the current day, on the program list display screen 1000. The user can select a tag of any date by operating the remote control 104. In a case where the tag of any date is selected, the television set 100 displays, on the program list display area 1020, a list of program information of the selected date, among the recommended program information which matches the search condition. For example, according to an example in FIG. 10, a tag of "today" is being selected. Accordingly, a list of program information of the current day, among the recommended program information which matches the search condition, is displayed on the program list display area 1020.

Note that, according to Embodiment 1, the television set 100 displays, on the program list display area 1020, a "CH (channel)", a "broadcasting station", a "program name", and a "broadcast date and time" of each of a plurality of pieces of program information (see FIG. 10). Note, however, that contents of each of the plurality of pieces of program information to be displayed in the list are not limited to such.

Note here that the user of the television set 100 is capable of selecting any program information, from among a plurality of pieces of program information displayed on the program list display area 1020, by carrying out a predetermined operation with the use of the remote control 104 or the like (not illustrated). By further conducting a predetermined operation while the any program information is being selected, the user of the television set 100 is capable of (i) setting timer viewing or timer recording with respect to a program of the selected program information or (ii) checking details of selected program information.

Note that, as described in FIG. 8 etc., the television set 100 of Embodiment 1 sequentially displays, from among a plurality of pieces of program information each of which matches a search condition, five pieces of program information of the current day one by one, and then sequentially displays five pieces of program information of the following day one by one.

According to the television set 100 of Embodiment 1, in a case where the "program list" button is pressed while program information of the current day is being displayed, the television set 100 automatically displays the program list display screen 1000 while a tag of the current day is being selected. That is, the television set 100 displays the program list display screen 1000 while a list of program information of the current day is being displayed on the program list display area 1020.

On the other hand, in a case where the "program list" button is pressed while program information of the following day is being displayed, the television set 100 automatically displays the program list display screen 1000 while a tag of the following day is being selected. That is, the television set 100 displays the program list display screen 1000 while a list of program information of the following day is being displayed on the program list display area 1020.

That is, in a case where the "program list" button is pressed while a certain piece of program information is being displayed, the television set 100 of Embodiment 1 is arranged to automatically display a list of program information on a program to be broadcasted on a date identical to a date on which such a certain piece of program information is being displayed.

(Procedure of Program Information Notification Process at Start of Program)

Figure 11:
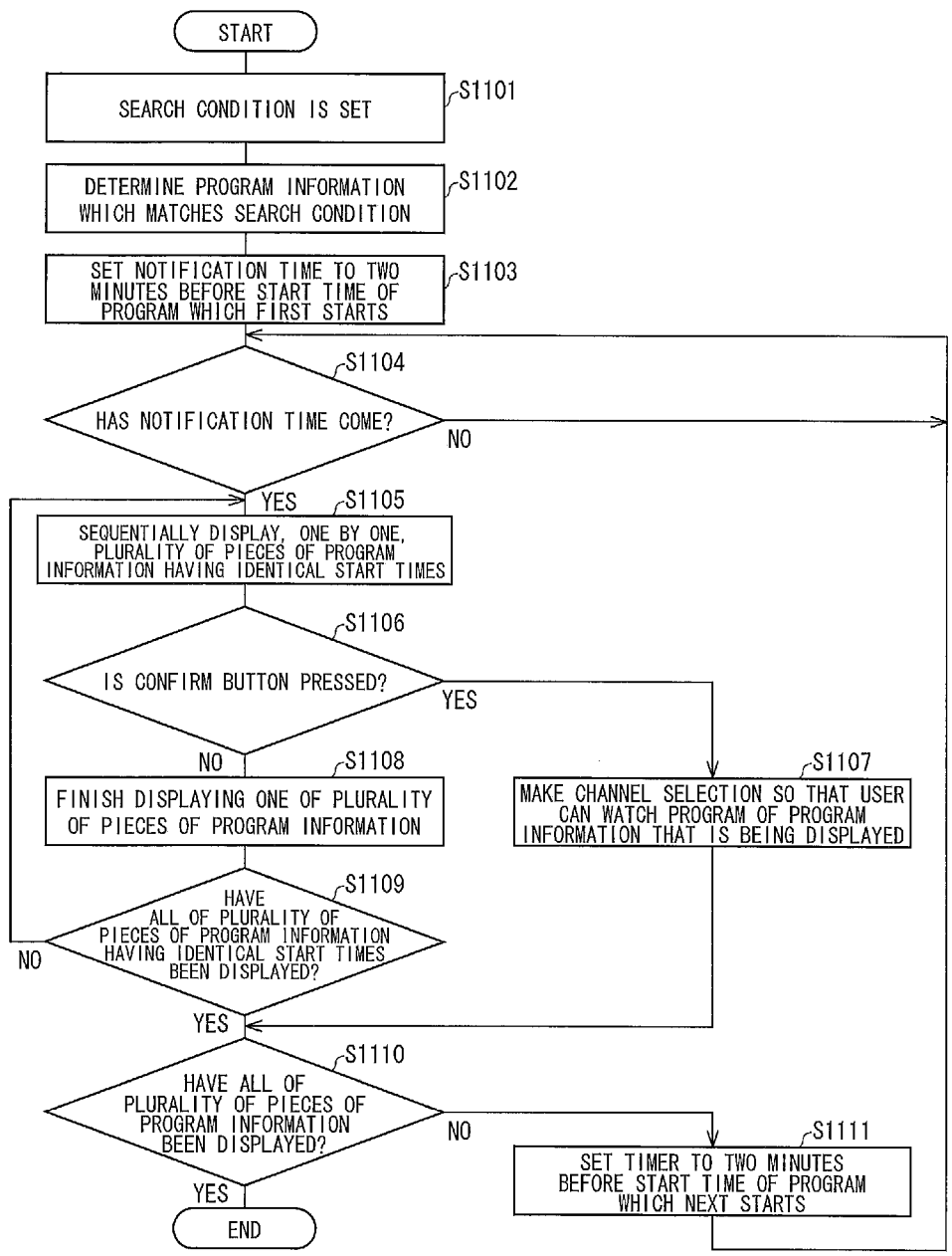
FIG. 11 is a flowchart illustrating how the television set 100 carries out a program information notification process.

The following description will discuss a procedure for the program information notification process carried out by the television set 100. FIG. 11 is a flowchart illustrating how the television set 100 carries out the program information notification process. As has been described, the television set 100 carries out the program information notification process (1) at startup of the television set 100 and (2) at a start of a program. The steps of the program information notification process (2) at a start of a program will be described. Note that, as illustrate in FIGS. 4 and 5, the following description will assume that a new search condition has been added after a search condition is stored in the search condition storing section 320, a plurality of pieces of program information are stored in the program information storing section 310, the determination section 330 has determined whether or not each of the plurality of pieces of program information matches the search condition.

A new search condition (N+1) is first set with respect to the television set 100 (step S1101), then the determination section 330 determines, as the recommended program information, program information which matches the new search condition (N+1) (step S1102). Specifically, as illustrated in FIG. 5, the determination section 330 sets, to "TRUE," a "search condition (N+1)" in a "search hit flag" section of the program information which matches the "search condition (N+1)".

Next, the notification section 340 selects, from among the recommended program information determined in the step S1102, a piece of program information in which the earliest starting time is set. The timer 350 then sets a notification time of such a program information to a predetermined time before the starting time of the program information (step S1103). Note that, according to Embodiment 1, the timer 350 sets a notification time of such a piece of program information to two minutes before a start time of program information. However, Embodiment 1 is not limited to such. In a case where there are a plurality of pieces of program information each having the earliest start time, the notification section 340 selects the plurality of pieces of program information each having the earliest start time, from among the plurality of pieces of program information determined as the recommended program information in the step S1102. The timer 350 then sets, to the start time common among the plurality of pieces of program information, notification times of the respective plurality of pieces of program information. Hereinafter, the following description will assume, in the step S1103, that a plurality of pieces of program information each having a common start time have been selected and notification times of the respective plurality of pieces of program information have been set to such a common start time.

Thereafter, when the notification time set in the step S1103 comes (Yes, in the step S1104), the notification section 340 starts a process in and after step S1105, which is a notification process of the plurality of pieces of program information selected in the step S1103. The notification section 340 stands by until the notification time set in the step S1103 comes (No, in the step S1104).

In the step S1105, the notification section 340 sequentially displays, one by one, the plurality of pieces of program information selected in the step S1103 (step S1105). Specifically, a program information notification window is displayed by the notification section 340 so as to be superimposed on an image that is currently displayed. The notification section 340 then sequentially displays, on the program information notification window, the plurality of pieces of program information determined in the step S1103, while scrolling the plurality of pieces of program information one by one. Note that Embodiment 1 does not particularly specify an order in which the plurality of pieces of program information are displayed in this step. Embodiment 1 is, however, not limited to such. Alternatively, the order can be determined based on some sort of condition.

Here, as described later with reference to FIG. 12, the notification section 340 displays, on the program information notification window, a "channel selection" button together with the plurality of pieces of program information to be recommended. The television set 100 monitors whether or not the "channel selection" button is pressed while the plurality of pieces of program information are being displayed (step S1106). In a case where the "channel selection" button is pressed while the plurality of pieces of program information are being displayed (Yes, in the step S1106), the television set 100 controls the channel selecting section 360 to make a channel selection so that the user can watch a program of program information that is being displayed (step S1107). The television set 100 then terminates the program information notification process. In a case where the "channel selection" button is not pressed while the plurality of pieces of program information are being displayed (No, in the step S1106), the notification section 340 continues to display the plurality of pieces of program information.

Thereafter, after the notification section 340 finishes displaying one (1) of the plurality of pieces of program information each having the common starting time (step S1108), the notification section 340 judges whether or not all of the plurality of pieces of program information determined in the step S1103 have been displayed (step S1109). In a case where the notification section 340 judges, in the step S1109, that "all of the plurality of pieces of program information determined in the step S1103 have been displayed" (Yes, in the step S1109), the television set 100 judges whether or not all of the plurality of pieces of program information determined, in the step S1102, as the recommended program information have been displayed (step S1110).

In a case where the television set 100 judges, in the step S1110, that "all of the plurality of pieces of program information determined, in the step S1102, as the recommended program information have been displayed" (Yes, in the step S1110), the television set 100 terminates the program information notification process.

On the other hand, in a case where the television set 100 judges, in the step S1110, that "all of the plurality of pieces of program information determined, in the step S1102, as the recommended program information have not yet been displayed" (No, in the step S1110), the notification section 340 selects, from among the recommended program information determined in the step S1102, program information which has the second earliest start time. The timer 350 then sets a notification time of the program information to two minutes before the start time of the program information (step S1111). Thereafter, the television set 100 returns to the step S1104 so as to repeat the process the step S1104 and subsequent steps.

With the procedure, from among a plurality of pieces of program information, the television set 100 determines, as the recommended program information, program information which matches a search condition, and then displays the recommended program information a predetermined time before a start time of the recommended program information. Particularly, in a case where there are a plurality of recommended pieces of program information having identical start times, the television set 100 sequentially displays, one by one, the plurality of recommended pieces of program information a predetermined time before the start time common among the plurality of recommended pieces of program information. In a case where the "channel selection" button is pressed while a piece of program information is being displayed, the television set 100 makes a channel selection so that the user can watch a program of such a piece of program information that is being displayed.

(Example Display of Program Information at Start of Program)

The following description will discuss an example of how program information is displayed when a program starts to be broadcasted. FIG. 12 is a view illustrating an example of how program information is displayed when a program starts to be broadcasted. A screen 1200 illustrated in FIG. 12 is a screen displayed on the LCD 210 of the television set 100. In the screen 1200, a program information notification window 1210 is displayed so as to be superimposed on an image that is currently displayed.

The program information notification window 1210 has a title display area 1212 and a program information display area 1214. According to Embodiment 1, "recommended programs will start" is displayed on the title display area 1212. Program information to be notified, as the recommended program information, to the user is displayed on the program information display area 1214. The notification section 340 sequentially displays, on the program information display area 1214, the program information on a program which will soon be broadcasted, while scrolling the program information. Particularly, in a case where there are a plurality of programs which will soon be broadcasted, the notification section 340 sequentially displays, one by one, a plurality of pieces of program information on the respective plurality of programs, while scrolling the plurality of pieces of program information.

Note that a "channel selection" button 1216 and operating instruction 1218 are displayed on the program information notification window 1210. As has been described, the television set 100 displays, on the program information display area 1214, a part of a plurality of pieces of program information each of which matches a search condition. In a case where the "channel selection" button 1216 is pressed while a pieces of program information is being displayed on the program information display area 1214, the television set 100 makes a channel selection so that the user can watch a program of such a piece of program information that is being displayed.

The channel selection also contains a switching operation of broadcasting types (digital terrestrial/BS/CS etc.) and a switching operation which is conducted based on externally supplied signal. In short, in a case where the "channel selection" button 1216 is pressed, the television set 100 makes a channel selection so that the user can watch a program of program information that is being displayed, without causing the user to conduct any operation after the "channel selection" button 1216 is pressed.

The operating instruction 1218 instructs an operation that can be conducted with respect to the program information notification window 1210 by use of the remote controller 104. For example, according to an example illustrated in FIG. 12, the operating instruction 1218 instructs the following (i) and (ii): (i) the "channel selection" button 1216 can be pressed by pressing a "confirm" button of the remote control 104; and (ii) the program information notification process can be terminated by pressing the "return" button of the remote control 104.

Figure 12:
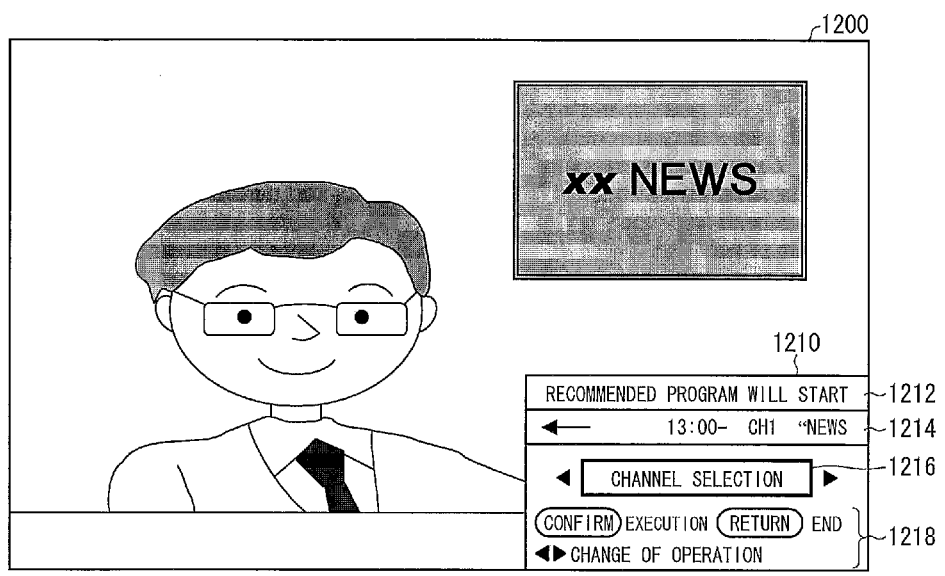
FIG. 12 is a view illustrating an example of how program information is displayed when a program starts to be broadcasted.

Note that the television set 100 is capable of displaying program information as illustrated in FIG. 12, irrespective of contents that are being displayed when a program starts to be broadcasted. For example, the television set 100 is capable of displaying program information (see FIG. 12), irrespective of broadcasting types (digital terrestrial/BS/CS etc.) when a program starts to be broadcasted. Alternatively, the television set 100 is capable of displaying program information (see FIG. 12), even if an externally supplied image is being displayed when a program starts to be broadcasted.

As described above, the notification section 340 displays, one by one, a plurality of pieces of program information having identical start times. That is, after the notification section 340 finishes displaying one of the plurality of pieces of program information, the notification section 340 starts displaying next one of the plurality of pieces of program information. Note here that a timing, at which one of the plurality of pieces of program information finishes displaying, is not limited to a specific one. For example, the notification section 340 can be arranged such that a display time per one (1) piece of program information is preset and the notification section 340 keeps displaying text information of the one piece of program information until the display time has elapsed. Alternatively, the notification section 340 can be arranged to finish displaying one (1) piece of program information when the notification section 340 finishes scrolling the last character of the one piece of program information, in a case where the notification section 340 displays the plurality of pieces of program information while scrolling them. Alternatively, the notification section 340 can be arranged such that a display time per one (1) piece of program information is preset and the notification section 340 keeps displaying text information of the one piece of program information while scrolling it until the display time has elapsed. Alternatively, the notification section 340 can be arranged to keep displaying text information of one (1) piece of program information until the user operates the notification section 340 so as to display next text information.

Note also that, according to Embodiment 1, the television set 100 displays a "start time", a "CH (channel)", and a "program name" for each of the plurality of pieces of program information (see FIG. 12). However, contents of each of the plurality of pieces of program information to be displayed are not limited to such.

Note further that, according to the example illustrated in FIG. 12, not only the plurality of pieces of program information, but also the "channel selection" button 1216 and the operating instruction 1218 are displayed on the program information notification window 1210. Embodiment 1 is, however, not limited to this. Alternatively, information, useful to the user, such as the number of the plurality of pieces of program information to be displayed or what number of the plurality of pieces of program information is currently displayed, can be further displayed on the program information notification window 1210.

According to the example illustrated in FIG. 12, the "channel selection" button 1216 is displayed on the program information notification window 1210. The television set 100 in accordance with Embodiment 1 is arranged such that a button displayed on the program information notification window 1210 can be sequentially switched from the "channel selection" button 1216 to another button by pressing a right button or a left button of the remote control 104 or the like.

The television set 100 includes, as the other buttons, a "timer recording" button, a "program detail display" button, a "split screen" button.

For example, in a case where the "timer recording" button is pressed, (i) the television set 100 carries out timer recording of a program of program information that is currently displayed on the program information display area 1214 or (ii) the television set 100 displays a screen for carrying out timer recording.

In a case where the "program detail display" button is pressed, the television set 100 displays, on any area of a screen, detailed information on a program of program information that is currently displayed in the program information display area 1214.

The "split screen" button can be displayed, in a case where (i) the television set 100 includes a plurality of tuners and (ii) a program that is currently watched is different from a program of program information that is being displayed on the program information display area 1214. In a case where the "split screen" button is pressed, the television set 100 splits the screen 1200 so as to display (i) the program that is currently watched and (ii) the program of the program information that is being displayed on the program information display area 1214.

It is thus preferable that the television set 100 further include, as the other buttons, a button for conducting an operation for program information that is being displayed on the program information display area 1214. This allows the television set 100 of Embodiment 1 to (i) notify the user of a plurality of pieces of program information and (ii) take, with a simple operation, a next action (in the above example, channel selection, timer recording, display program details, and split of screen) with respect to a program among the plurality of pieces of program information in which program the user shows an interest.

Note that, in a case where the switching to one of the other buttons is enabled like above, it is preferable to display, near the "channel selection" button 1216 or in the operating instruction 1218, an instruction prompting the user to consider whether to carry out such switching by pressing the right button or the left button of the remote control or the like (see FIG. 12). Note that the switching is carried out by pressing the right button or the left button of the remote control 104 or the like. Embodiment 1 is, however, not limited to such. The switching can be carried out (i) by pressing an up button or the down button of the remote control 104 or the like or (ii) by any other operation. Note that the other buttons are displayed by carrying out the switching. However, the other buttons can be displayed instead of carrying out the switching.

(Procedure of Displaying a Plurality of Pieces of Program Information Having Identical Start Times)

Figure 13:
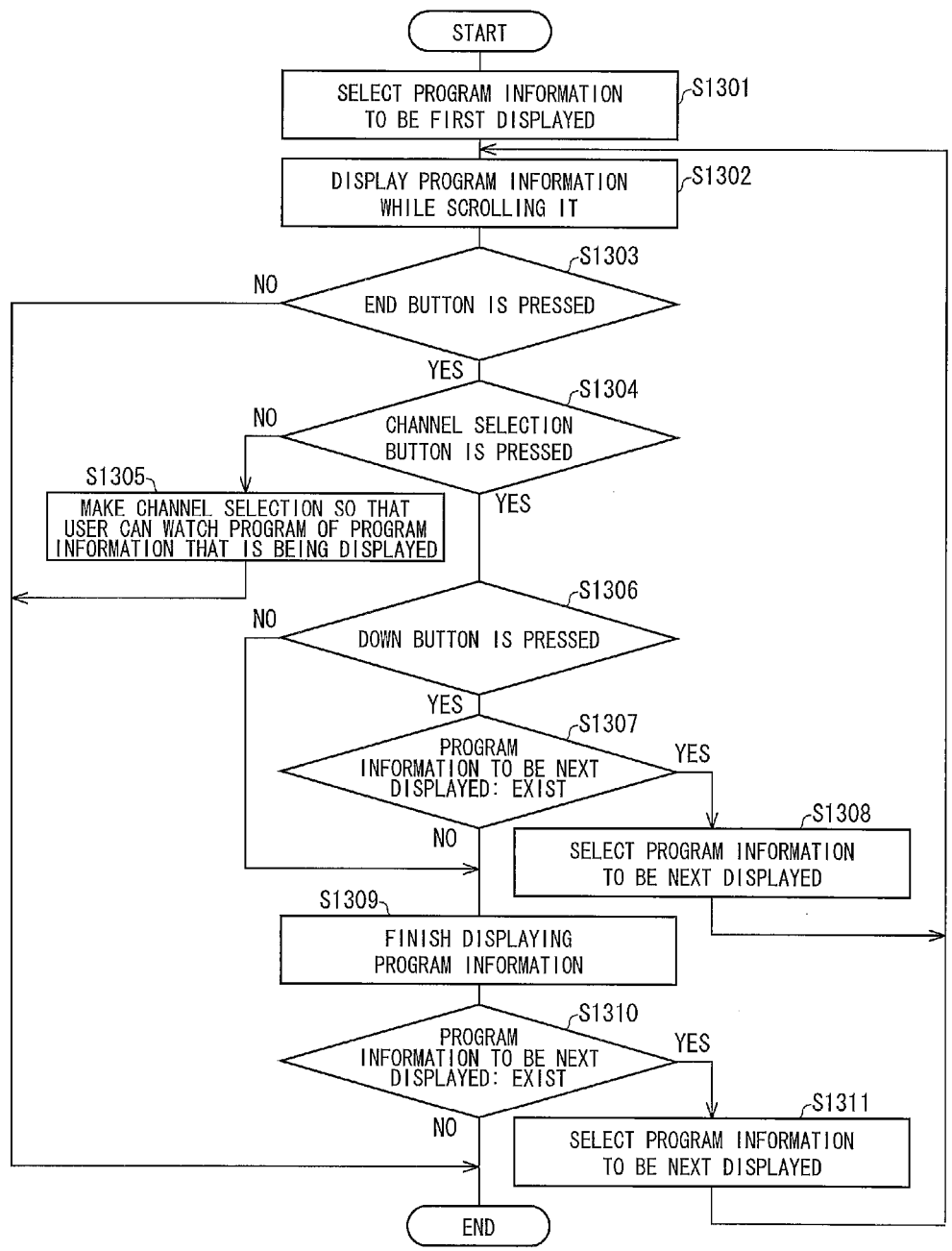
FIG. 13 is a flowchart specifically illustrating how the television set 100 displays a plurality of pieces of program information having identical start times.

The following description will more specifically discuss how the television set 100 displays a plurality of pieces of program information having identical start times. FIG. 13 is a flowchart specifically illustrating how the television set 100 displays plurality of pieces of program information having identical start times. Note here that the following description will assume that a plurality of pieces of program information, having identical start times, have been determined as the recommended program information, and then a notification time, set to a predetermined time before the start time common among the plurality of pieces of program information, has come.

The notification section 340 first selects program information to be first displayed, from among the plurality of pieces of program information having identical start times (step S1301). The notification section 340 then displays the program information thus selected while scrolling the program information (step S1302).

The television set 100 monitors whether or not the "finish" button of the remote control 104 is pressed while the program information is being displayed (step S1303). In a case where the "finish" button is pressed while the program information is being displayed (Yes, in the step S1303), the television set 100 terminates the program information notification process. In a case where the "finish" button is not pressed while the program information is being displayed (No, in the step S1303), the television set 100 continues to display the program information.

As has been described with reference to FIG. 11, the notification section 340 displays, on the program information notification window, the "channel selection" button together with the recommended program information. The television set 100 monitors whether or not the "channel selection" button is pressed while the program information is being displayed (step S1304). In a case where the "channel selection" button is pressed while the program information is being displayed (Yes, in the step S1304), the television set 100 makes a channel selection so that the user can watch a program of the program information that is being displayed by a process in the step S1302 (step S1305), and then terminates the program information notification process. On the other hand, in a case where the "channel selection" button is not pressed while the program information is being displayed (No, in the step S1304), the television set 100 continues to display the program information.

The television set 100 further monitors whether or not the down button of the remote control 104 is pressed while the program information is being displayed (step S1306). In a case where the down button is pressed while the program information is being displayed (Yes, in the step S1306), the notification section 340 judges whether or not there is program information to be next displayed (step S1307). Then, in a case where the notification section 340 judges that "there is program information to be next displayed" (Yes, in the step S1307), the notification section 340 selects program information to be next displayed, from among the plurality of pieces of program information having identical start times (step S1308). The notification section 340 then returns to the step S1302 so as to display the program information thus selected while scrolling the program information (steps S1302).

On the other hand, in a case where the down button is not pressed while the program information is being displayed (No, in the step S1306), the television set 100 continues to display the program information. Further, in a case where the notification section 340 judges, in the step S1307, that "there is no program information to be next displayed" (No, in the step S1307), the television set 100 also continues to display the program information.

Thereafter, when the notification section 340 finishes displaying the program information, which is displayed in the step S1302 (step S1309), the notification section 340 judges whether or not there is program information to be next displayed (step S1310). In a case where the notification section 340 judges that "there is program information to be next displayed" (Yes, in the step S1310), the notification section 340 selects program information to be next displayed, from among the plurality of pieces of program information having identical start times (step S1311). The notification section 340 then returns to the step S1302 so as to display the program information thus selected while scrolling the program information (step S1302). In a case where the notification section 340 judges, in the step S1310, that "there is no program information to be next displayed" (No, in the step S1310), the television set 100 finishes displaying the plurality of pieces of program information having identical start times. This is because all of the plurality of pieces of program information having identical start times have been displayed.

(Narrowing Function)

The television set 100 of Embodiment 1 is configured to notify the user of a plurality of pieces of program information each of which matches a search condition. However, in a case where the number of the plurality of pieces of program information each of which matches the search condition is huge, it is not preferable to notify the user of such a huge number of the plurality of pieces of program information. This is because such a notification will bring about the mess. Furthermore, even if the plurality of pieces of program information each match the search conditions, the user may feel unpleasant if the plurality of pieces of program information are notified to the user without pause. In view of the circumstances, the television set 100 of Embodiment 1 has a narrowing function for narrowing the program information to be notified to the user, among the plurality of pieces of program information each of which matches the search condition. The following description will discuss the narrowing function of the television set 100.

(Program Information Notification Function Setting Screen)

Figure 14:
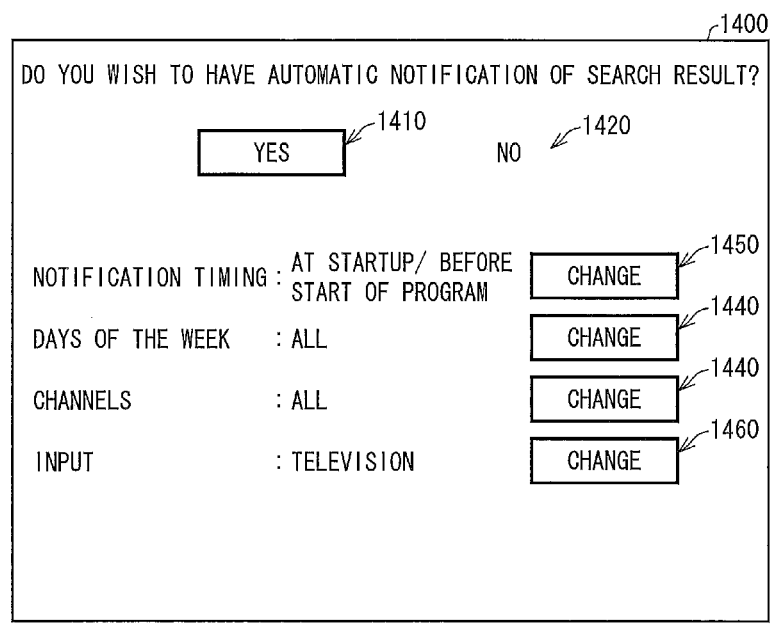
FIG. 14 is a view illustrating an example display of a screen for main settings related to a program information notification function.

FIG. 14 is a view illustrating an example display of a screen for main settings related to the program information notification function. A screen 1400 illustrated in FIG. 14 is a screen displayed on the LCD 210 of the television set 100. The screen 1400 is prepared for the main settings related to the program information notification function.

For example, a message of "Do you wish to have automatic notification of a search result?," a "Yes" button 1410, and a "No" button 1420 are displayed on the screen 1400. The user can carry out, with respect to the television set 100, setting of whether or not to utilize the program information notification function, by selecting one of the "Yes" button 1410 and the "No" button 1420.

In a case where the user selects, for example, the "Yes" button 1410, the television set 100 notifies the user of a plurality of pieces of program information each of which matches a search condition, as has been described. Such a selection of the "Yes" button 1410 causes the narrowing function to be enabled. This makes it possible to narrow (i) days of the week on which programs are notified to the user and (ii) channels of the respective programs. Accordingly, each of "change" buttons 1430, 1440, 1450, and 1460 (described below) is enabled so that the user can adjust such settings.

On the other hand, in a case where the user selects the "No" button 1420, the television set 100 does not notify the user of any piece of program information even if such any piece of program information matches the search condition. Such a selection of the "No" button 1420 causes the narrowing function to be disabled. This disables narrowing of (i) days of the week on which programs are notified to the user and (ii) channels of the respective programs. Accordingly, each of the "change" buttons 1430 and 1440 is disabled so that the user cannot adjust such settings.

The "change" button 1430 for narrowing days of the week on which program information is notified to the user is displayed on the screen 1400. When the user presses the "change" button 1430, the television set 100 is caused to display a setting screen for narrowing days of the week on which program information is notified to the user (described later with reference to FIG. 15). Note that, according to an example illustrated in FIG. 14, a message of "days of the week: all" is displayed next to the "change" button 1430. This message indicates the current setting of the narrowing function for narrowing the days of the week on which program information is notified to the user. For example, according to an example in FIG. 14, the message of "days of the week: all" is displayed. Such a setting indicates that program information is to be notified to the user on all days of the week.

The "change" button 1440 for narrowing channels, via which program information is notified to the user, is displayed on the screen 1400. When the user presses the "change" button 1440, the television set 100 is caused to display a setting screen for narrowing channels via which program information is notified to the user (described later in FIG. 16). Note that, according to the example illustrated in FIG. 14, a message of "channels: all" is displayed next to the "change" button 1440. This message indicates the current setting of the narrowing function for narrowing the channels via which program information is displayed. For example, according to the example illustrated in FIG. 14, the message of "channel: all" is displayed. Such a setting indicates that program information is to be notified to the user via all channels.

Furthermore, the "change" button 1450 for narrowing a timing, at which program information is notified to the user, is displayed on the screen 1400. When the user presses the "change" button 1450, the television set 100 is caused to display a setting screen for narrowing a timing at which program information is notified to the user (described later in FIG. 17). Note that, according to the example illustrated in FIG. 14, a message of "at startup/before a start of a program" is displayed next to the "change" button 1450. This message indicates the current setting of the narrowing function for narrowing the timing at which program information is notified to the user. For example, according to the example illustrated in FIG. 14, the message of "at startup/before a start of a program" is displayed. Such a setting indicates that program information is to be notified to the user at startup of the television set 100 and right before a start of a program of the program information.

Moreover, the "change" button 1460 for narrowing types of television input, via which program information is notified to the user, is displayed on the screen 1400. When the user presses the "change" button 1460, the television set 100 is caused to display a setting screen for narrowing types of television input via which program information is notified to the user (described later in FIG. 18). Note that, according to the example illustrated in FIG. 14, a message of "television" is displayed next to the "change" button 1460. This message indicates the current setting of the narrowing function for narrowing the types of television input via which program information is notified. For example, according to the example illustrated in FIG. 14, the message of "television" is displayed. Such a setting indicates that program information is to be notified to the user only in a case where input of the television set 100 is set to "while viewing television".

(Screen for Setting Days of the Week on which Program Information is to be Notified to User)

FIG. 15 is a view illustrating an example display of a setting screen for narrowing days of the week on which program information is to be notified to the user. A screen 1500 illustrated in FIG. 15 is a screen displayed on the LCD 210 of the television set 100. The screen 1500 is a setting screen for narrowing days of the week on which program information is to be notified to the user.

In the screen 1500, for example, a "notify" button and a "not notify" button are displayed for each day of the week, i.e., from Sunday to Saturday. The user selects, on the screen 1500, the "notify" button for a day of the week on which the user wishes program information to be notified to the user. On the other hand, the user selects the "not notify" button for a day of the week on which the user does not wish program information to be notified to the user.

The television set 100 judges, for each day of the week from Sunday to Saturday, whether or not to notify the user of program information in accordance with a setting on the screen 1500. According to an example illustrated in FIG. 15, "notify" buttons are selected for Sunday and Saturday, and "not notify" buttons are selected for the other days of the week.

According to this setting, the television set 100 will notify the user of program information which matches a search condition and which is related to a program to be broadcasted on Sunday and Saturday, as has been described. On the other hand, the television set 100 will not notify the user of program information related to a program to be broadcasted on the other days of the week, even if the program information which matches the search condition.

(Program Information Notification Channel Setting Screen)

FIG. 16 is a view illustrating an example display of a setting screen for narrowing channels via which program information is notified to the user. A screen 1600 illustrated in FIG. 16 is a screen displayed on the LCD 210 of the television set 100. The screen 1600 is a setting screen for narrowing channels via which program information is notified to the user.

A "notify" button and a "not notify" button are displayed on the screen 1600 for each channel via which the television set 100 can receive a program(s). The user selects a "notify" button for a channel via which the user wishes to receive program information. On the other hand, the user selects "not notify" button for a channel via which the user does not wish to receive program information.

The television set 100 judges, for each channel via which the television set 100 can receive, whether or not to notify the user of program information in accordance with a setting on the screen 1600. According to an example illustrated in FIG. 16, "notify" buttons are selected for a "CH1" and a "CH7", and "not notify" buttons are selected for the other channels.

According to this setting, the television set 100 will notify the user of program information which matches a search condition and which is on a program(s) to be broadcasted via the "CH1" and the "CH7". On the other hand, the television set 100 will not notify the user of program information on programs to be broadcasted via the other channels, even if the program information which matches the search condition.

(Screen for Setting a Timing when Program Information is to be Notified)

Figure 17:
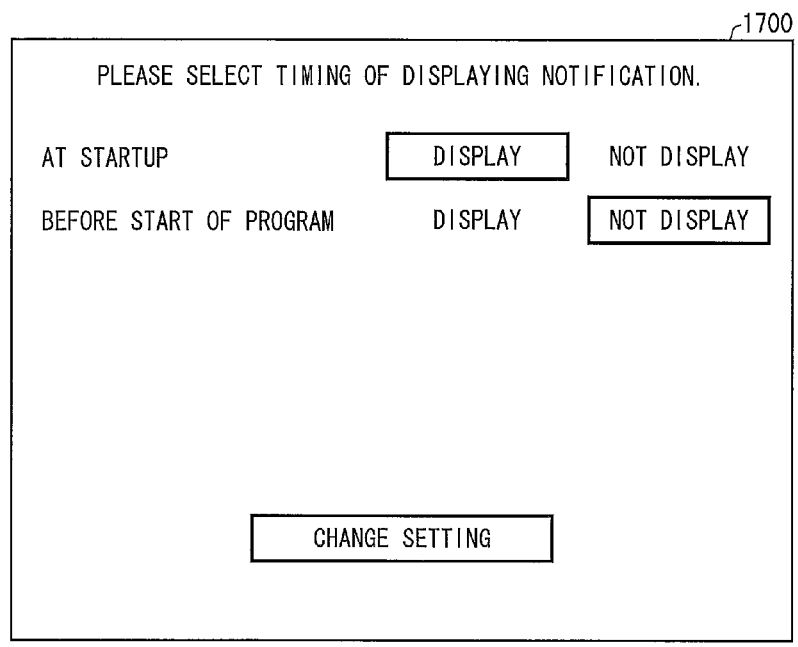
FIG. 17 is a view illustrating an example display of a setting screen for narrowing timings at which program information is to be notified.

FIG. 17 is a view illustrating an example display of a setting screen for narrowing timings at which program information is to be notified. A screen 1700 illustrated in FIG. 17 is a screen displayed on the LCD 210 of the television set 100. The screen 1700 is a setting screen for narrowing timings at which program information is to be notified.

For example, a "notify" button and a "not notify" button are displayed on the screen 1700 for each of a "at startup" and a "before start of program". The user selects the "notify" button for a timing at which the user wishes to receive program information. On the other hand, the user selects the "not notify" button for a timing at which the user does not wish to receive program information. Note that the user will select a "change setting" button so as to reflect such a setting change.

The television set 100 judges whether or not to notify, at each timing of "at startup" and "before a start of a program," the user of program information in accordance with a setting on the screen 1700.

(Screen for Setting Input Types of Program Information Notification)

Figure 18:
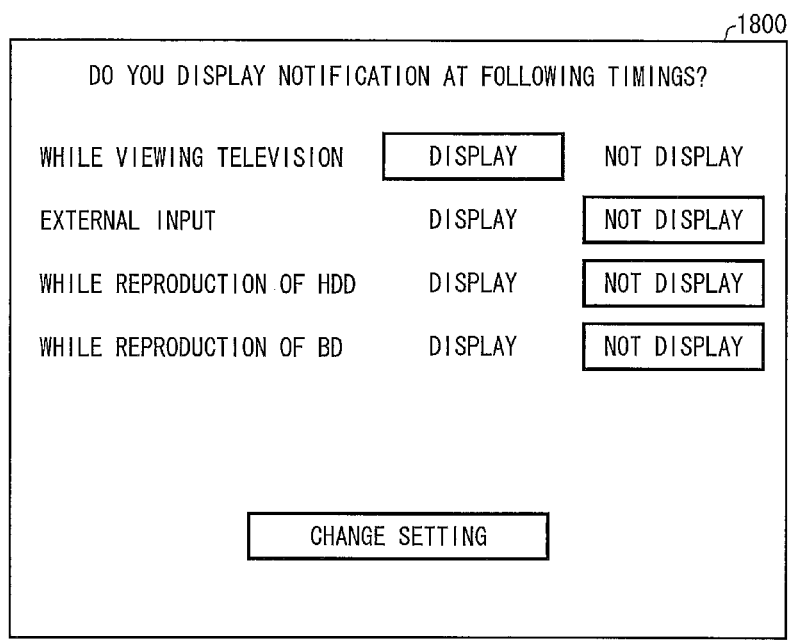
FIG. 18 is a view illustrating an example display of a setting screen for narrowing input types in which program information is to be notified.

FIG. 18 is a view illustrating an example display of a setting screen for narrowing input types in which program information is to be notified. A screen 1800 illustrated in FIG. 18 is a screen displayed on the LCD210 of the television set 100. The screen 1800 is a setting screen for narrowing input types in which program information is notified.

For example, a "notify" button and a "not notify" button are displayed on the screen 1800 in each of a "while viewing television", an "external input", a "while reproduction of HDD", and a "while reproduction of BD". The user selects the "notify" button for an input type in which the user wishes to receive program information, and selects the "not notify" button for an input type in which the user does not wish to receive program information. Note that the user will select a "change setting" button so as to reflect such a setting change.

The television set 100 judges, for each of the "while viewing television", the "external input", the "while reproduction of HDD", and the "while reproduction of BD", whether or not to notify the user of program information in accordance with a setting on the screen 1800.

Note that the input types to be displayed on the screen 1800 are not limited to the ones illustrated in FIG. 18. A different input type can be displayed on the screen 1800, depending on how the television set 100 is configured. For example, in a case where the television set 100 does not include an HDD or a BD, it is not necessary to display the "while reproduction of HDD" or the "while reproduction of BD", respectively. Alternatively, the "while reproduction of HDD" or the "while reproduction of BD" can be displayed in an inoperable state. In a case where an input type other than the input types illustrated in FIG. 18 is available for the television set 100, such an input type (e.g. "while reproduction of USB-HDD" and/or "while accessing the Internet") can be displayed.

The television set 100 of Embodiment 1 employs a configuration in which the user is thus allowed to carry out a setting for narrowing program information to be notified to the user, from among a plurality of pieces of program information each of which matches a search condition. This configuration prevents the television set 100 from notifying the user of a huge number of the plurality of pieces of program information. In addition, this configuration prevents the television set 100 from notifying the user of the plurality of pieces of program information without pause.

As has been described, the television set 100 of Embodiment 1 is configured to notify a user of a plurality of pieces of program information each of which matches a search condition set beforehand. With this configuration, since the plurality of pieces of program information each of which matches the search condition are notified to the user as recommended program information, the user can recognize the plurality of pieces of program information. This allows the user to determine and watch a program which more suits to the user's taste than the other(s) by, for example, comparing the plurality of pieces of program information. That is, the user will never miss a program which more suits to the user's taste than the other(s). To put it another way, the television set 100 of Embodiment 1 can notify the user of program information which suits to the user's taste, in a form of notification more useful to the user.

Particularly, the television set 100 of Embodiment 1 is arranged to sequentially notify, one by one, the user of the plurality of pieces of program information. This allows a space, on a screen, for displaying the plurality of pieces of program information to be minimized even in a case where the plurality of pieces of program information are displayed and notified to the user. It is therefore possible to notify the user of the plurality of pieces of program information without needlessly hindering the user from watching an image that is currently displayed on the screen.

Furthermore, the television set 100 of Embodiment 1 is arranged to notify, at startup of the television set 100, the user of the plurality of pieces of program information which have been extracted. It can be said that the startup of the television set 100 is a timing at which the user particularly wonders which program to watch. According to the television set 100 of Embodiment 1, the plurality of pieces of program information are notified to the user at such a timing. This means that it is possible to notify the user of the plurality of pieces of program information at a timing more useful to the user.

Furthermore, the television set 100 of Embodiment 1 is arranged to determine, from among the plurality of pieces of program information, a plurality of pieces of program information to be preferentially displayed and notify the user of the plurality of pieces of program information to be preferentially displayed. This allows the space on the screen or a display time for displaying the plurality of pieces of program information to be minimized. Therefore, it is possible to notify the user of the plurality of pieces of program information without needlessly hindering the user from watching an image that is currently displayed on the screen.

According to the television set 100 of Embodiment 1, a list of the plurality of pieces of program information which have been extracted is displayed in a case where a predetermined operation is carried out by the user while the plurality of pieces of program information are being notified to the user. This makes it possible to notify the user of the plurality of pieces of program information without needlessly hindering the user from watching am image that is currently displayed on the screen. In addition, this allows the user to confirm remaining pieces of program information, which have not notified to the user, merely by causing the user to carry out the predetermined operation.

Particularly, the television set 100 of Embodiment 1 is arranged to display, from among the plurality of pieces of program information which have been extracted, a list of a plurality of pieces of program information each having a broadcast date identical to a broadcast date set in program information that is being displayed, in a case where a predetermined operation is carried out by the user while the plurality of pieces of program information which have been extracted are being notified to the user.

In a case where an operation for displaying a list of a plurality of pieces of program information is carried out by the user while a piece of program information is being displayed, the user is highly likely to wish to know what other pieces of program information are available as program information whose broadcast date is identical to a broadcast date of such a piece of program information. According to the television set 100 of Embodiment 1, the list of the plurality of pieces of program information each having a broadcast date identical to a broadcast date of a piece of program information that is being displayed is displayed, in a case where an operation for displaying the list of the plurality of pieces of program information is conducted. This makes it possible to notify the user of the plurality of pieces of program information which contain contents more useful to the user.

According to the television set 100 of Embodiment 1, in a case where a plurality of pieces of program information having identical start times are extracted, the plurality of pieces of program information is notified to the user a predetermined time before the start time of the plurality of pieces of program information. It can be said that a start time of a program is a timing at which the user particularly wonders which program to watch. According to the present invention, the plurality of pieces of program information are notified to the user at such a timing. This means that it is possible to notify the user of the plurality of pieces of program information at a timing useful to the user.

Further, the television set 100 of Embodiment 1 preferably includes a channel selecting section which makes a channel selection so that the user can watch a program of a piece of program information that is being notified to the user, in a case where a given operation is conducted by the user while the plurality of pieces of program information having identical start times are being notified to the user. With the configuration, even in a case where the plurality of pieces of program information are displayed, it is not necessary to select, from among the plurality of pieces of program information, program information on a program which the user wishes to watch. The user can easily select such a program by conducting a given operation while the program information on such a program which the user wishes to watch is being displayed.

Among the plurality of pieces of program information, the television set 100 of Embodiment 1 is arranged (i) not to notify the user of any program information on a program to be broadcasted on a day of the week which is set beforehand as a non-notification day of the week and (ii) to notify the user of program information on a program to be broadcasted on a day of the week which is set beforehand as a notification day of the week. With the arrangement, no program information on a channel, which is highly likely not to be selected by the user, is notified to the user. It is therefore possible to notify the user of a plurality of pieces of program information which are more useful to the user.

Further, among the plurality of pieces of program information, the television set 100 of Embodiment 1 is arranged (i) not to notify the user of any program information on a program to be broadcasted via a channel which is set beforehand as a non-notification channel and (ii) to notify the user of program information on a program to be broadcasted via a channel which is set beforehand as a notification channel. With this arrangement, no program information on a program to be broadcasted on a day, which is highly likely not to be selected by the user, is notified to the user. It is therefore possible to notify the user of a plurality of pieces of program information which are more useful to the user.

(Program, Recording Medium)

Each section of the program information notification device (television set 100) described in each embodiment can be realized by (i) hardware configuration employing logic circuits formed on an integrated circuit (IC chip) or (ii) software configuration by use of a CPU (Central Processing Unit).

Specifically, the program information notification device includes (i) a CPU which executes a command of a program that implements each function of the program information notification device, (ii) a ROM (Read Only Memory) in which the program is stored, (iii) a RAM (Random Access Memory) which extracts the program in executable form, and (iv) a storage device (a recording medium) such as a memory in which the program and various sets of data are stored. The object of the present invention can be attained by (i) supplying the program information notification device with a recording medium in which program codes (an executable program, an intermediate code program, and a source program) of a control program of the program information notification device, which is software that implements the each function, are computer-readably recorded and (ii) causing a computer of the program information notification device (or a CPU or an MPU) to read and carry out the program codes recorded in the recording medium.

Examples of the recording medium include (i) tapes such as a magnetic tape and a cassette tape, (ii) disks including magnetic disks such as a Floppy® disk and a hard disk, and optical disks such as a CD-ROM, an MO, an MD, a DVD, and a CD-R, (iii) cards such as an IC card (including a memory card) and an optical card, (iv) semiconductor memories realized by a mask ROM, EPROM, EEPROM, a flash ROM, and (v) logic circuits such as a PLD (Programmable Logic Device) and an FPGA (Field Programmable Gate Array).

Further, the program codes can be supplied to the program information notification device via a communication network. This communication network is not limited in particular, provided that the communication network is capable of supplying the program codes to the program information notification device. Examples of the communication network include the Internet, an intranet, an extranet, a LAN, ISDN, VAN, a CATV communications network, a virtual private network, a telephone network, a mobile telecommunications network, and a satellite communication network. Further, a transmission medium of which a communication network is composed is not limited to any particular one, provided that the transmission medium is capable of transmitting the program codes. Examples of the transmission medium include: wired transmission media such as IEEE1394, a USB, a power-line carrier, a cable TV circuit, a telephone line, and ADSL (Asymmetric Digital Subscriber Line); and wireless transmission media such as infrared communication systems such as IrDA and a remote control, Bluetooth (Registered Trademark), IEEE80211 wireless communication system, HDR (High Data Rate), NFC (Near Field Communication), DLNA, a mobile phone network, a satellite circuit, and a digital terrestrial network.

(Modification)

Modifications of Embodiment 1 will be described below.

(Modification 1)

Figure 19:
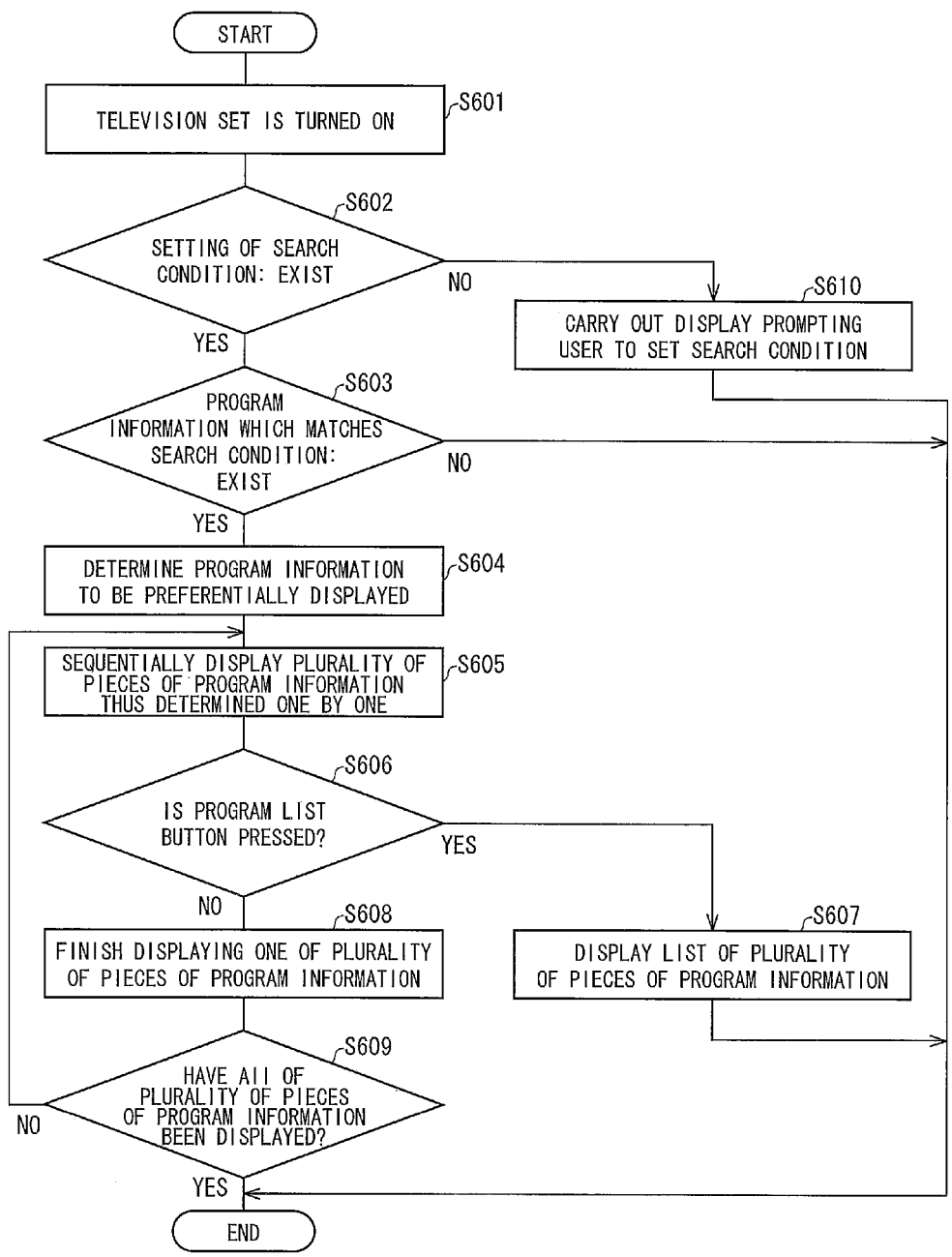
FIG. 19 is a flowchart (modification) illustrating how the television set 100 carries out a program information notification process.
Figure 20:
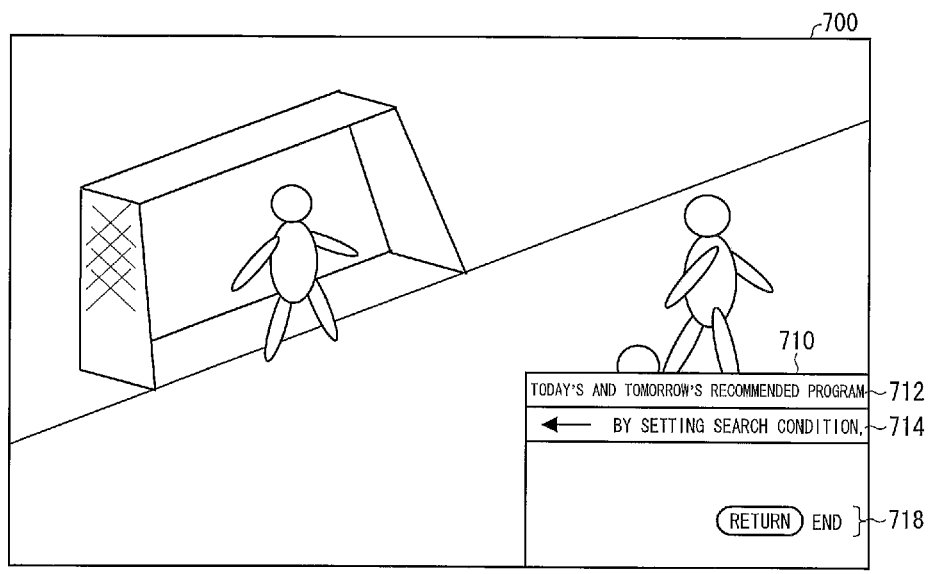
FIG. 20 is a view illustrating an example display (modification) of program information at startup of a television set.

The following description will first discuss Modification 1 of Embodiment 1 with reference to FIGS. 19 and 20. FIG. 19 is a flowchart (modification) illustrating how the television set 100 carries out a program information notification process. FIG. 20 is a view illustrating an example display (modification) of program information at startup of the television set.

According to FIG. 19, a process of carrying out a display prompting the user to set a search condition (step S610) is added as a process that the television set 100 carries out, in a case where no search condition is set (No, step S602). In this regard, FIG. 19 is different from FIG. 6. That is, according to Modification 1, the television set 100 carries out a display prompting the user to set a search condition in a case where no search condition is set.

An example display, prompting the user to set a search condition, is illustrated in FIG. 20. In a case where no search condition is set, a message of "today's and tomorrow's recommended programs can be displayed by setting a search condition" is displayed, while being scrolled, on the program information display area 714 of the program information notification window 710 (see FIG. 20). With the arrangement, the television set 100 prompts the user to set a search condition.

Note that, according to an example illustrated in FIG. 20, the operating instruction 718 of the program information notification window 710, which only shows that the program information notification process can be terminated by pressing the "return" button of the remote control 104, is displayed on the program information notification window 710. Alternatively, the operating instruction 718, which further shows a button or an operating instruction on displaying a screen on which a search condition is set, can be displayed on the program information notification window 710.

(Modification 2)

Figure 21:
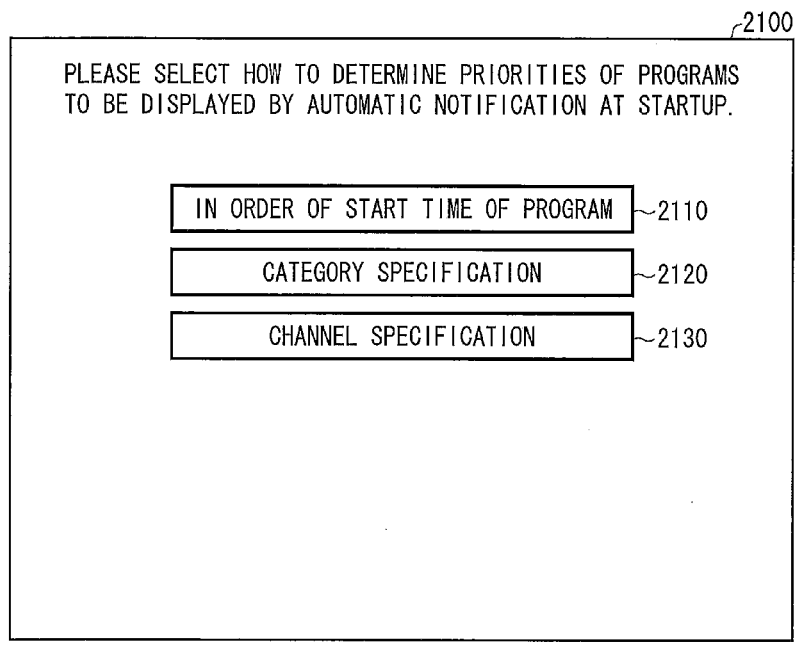
FIG. 21 is a view illustrating an example display of a setting screen for setting a priority condition so as to determine a priority of each of a plurality of pieces of program information.
Figure 23:
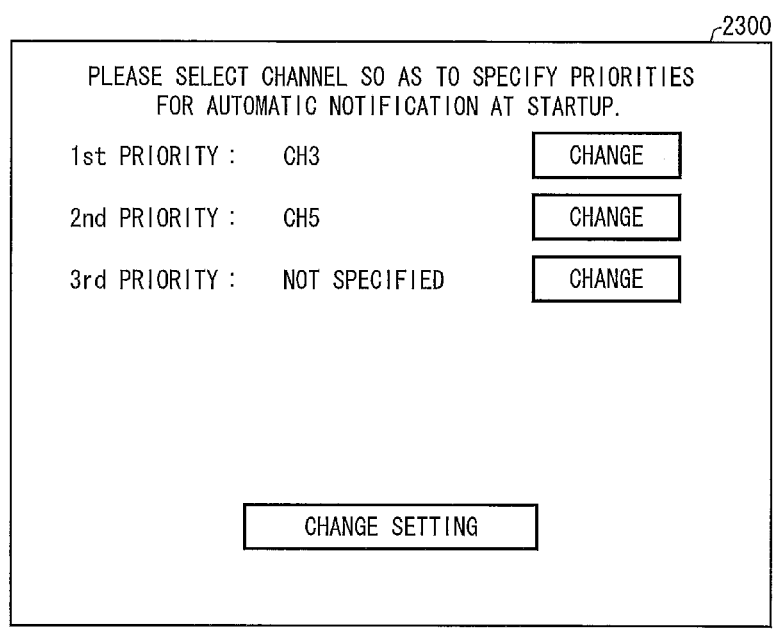
FIG. 23 is a view illustrating an example display of a setting screen for specifying, by channel, priorities of a plurality of pieces of program information.

The following description will discuss Modification 2 of Embodiment 1 with reference to FIGS. 21 through 23.

According to Embodiment 1, a plurality of pieces of program information are displayed in order of start time. Embodiment 1 is, however, not limited to such. The television set 100 can be arranged such that (i) a priority of each of the plurality of pieces of program information is determined in accordance with a priority condition and (ii) the each of the plurality of pieces of program information is displayed in accordance with the priority thus determined.

For example, the television set 100 can be arranged such that (i) a program which the user seems to be interested in (e.g., a program which the user often watches, a program in a category which the user often watches, a program on a channel which the user often watches, and a program which the user watched in a previous week) is specified in accordance with a history of viewing and the like and (ii) program information on such a program is preferentially displayed.

Alternatively, the television set 100 can be arranged such that the user optionally sets the priority condition. The following description will discuss an example setting screen of the priority condition.

FIG. 21 is a view illustrating an example display of a setting screen for setting a priority condition so as to determine a priority of each of a plurality of pieces of program information. A screen 2100 illustrated in FIG. 21 is a screen displayed on the LCD 210 of the television set 100. The screen 2100 is a screen for setting a priority condition so as to determine the priority of the each of a plurality of pieces of program information. An "in order of start time of program" button 2110, a "category specification" button 2120, and a "channel specification" button 2130 are displayed on the screen 2100.

The user can cause the television set 100 to display the plurality of pieces of program information in order of start time, by pressing the "in order of starting time of program" button 2110.

The user can cause the television set 100 to display a setting screen for specifying, by category, the priority of each of the plurality of pieces of program information (described later with reference to FIG. 22), by pressing the "category specification" button 2120.

The user can also cause the television set 100 to display a setting screen for specifying the priority of each of the plurality of pieces of program information in accordance with channels (described later in FIG. 23), by pressing the "channel specification" button 2130.

(Setting Screen for Specifying Priority by Category)

FIG. 22 is a view illustrating an example display of a setting screen for specifying, by category, priorities of a plurality of pieces of program information. A screen 2200 illustrated in FIG. 22 is a screen displayed on the LCD 210 of the television set 100. The screen 2200 is a setting screen for specifying, by category, the priorities of the respective plurality of pieces of program information. According to the example, the screen 2200 is arranged such that the first through third priories are determined by category.

For example, according to the example illustrated FIG. 22, the screen 2200 shows that (i) a category of "sports" is set as the first priority, (ii) a category of "drama" is set as the second priority, and (iii) no category is set as the third priority condition.

Note that a "change" button is displayed, on the screen 2200, for each of the first through third priorities. By selecting, on the screen 2200, the "change" button of any of the first through third priorities of which the user wishes to change a setting, the user can cause the television set 100 to display another setting screen (not illustrated) for setting any category for the any of the first through third priorities. The user can change the setting on such another setting screen.

The television set 100 determines the priorities of the respective plurality of pieces of program information in accordance with the setting on the screen 2200, and then displays the plurality of pieces of program information in accordance with the respective priorities.

For example, in a case where (i) program information A and C each have a category of "sports," (ii) program information B and D each have a category of "drama," and (iii) program information E has a category of neither "sports" nor "drama," the television set 100 displays the five pieces of program information A, C, B, D, and E in this order.

In a case where (i) program information A, B, D, and E each have a category of "sports" and (ii) program information C has a category of "drama", the television set 100 displays the five pieces of program information A, B, D, E, and C in this order.

(Setting Screen for Specifying Priority by Channel)

FIG. 23 is a view illustrating an example display of a setting screen for specifying priorities of a plurality of pieces of program information by channel. A screen 2300 illustrated in FIG. 23 is a screen displayed on the LCD 210 of the television set 100. The screen 2300 is a setting screen for specifying the priorities of the respective plurality of pieces of program information by channel. According to this example, the screen 2300 is arranged such that the first through third priorities are determined by channel.

For example, according to the example illustrated in FIG. 23, the screen 2300 shows that (i) a channel "CH3" is set as the first priority, (ii) a channel "CH5" is set as the second priority, and (iii) no channel is set as the third priority.

Note that a "change" button is displayed, on the screen 2300, for each of the first through third priorities. By selecting, on the screen 2300, the "change" button of any of the first through third priorities of which the user wishes to change a setting, the user can cause the television set 100 to display another setting screen (not illustrated) for setting any channel for the any of the first through third priorities. The user can change the setting on such another setting screen.

The television set 100 determines the priorities of the respective plurality of pieces of program information in accordance with the setting on the screen 2300, and displays the plurality of pieces of program information in accordance with the respective priorities.

For example, in a case where (i) program information A and C each have a channel "CH3", (ii) program information B and D each have a channel "CH5", and (iii) program information E has a channel of neither "CH3" nor "CH5", the television set 100 displays the five pieces of program information A, C, B, D, E in this order.

In a case where the (i) program information A, B, D, and E each have a channel "CH3" and (ii) program information C has a channel "CH5", the television set 100 displays the five pieces of program information A, B, D, E, and C in this order.

Note that the television set 100 can be arranged such that the "in order of star time of program," the "category specification," or the "channel specification" illustrated in FIG. 21 or in combination is employed so as to determine the priority. According to the settings illustrated in FIGS. 22 and 23, in a case where the "category specification" and the "channel specification" are both employed, program information, which has (i) a category of "sports" and (ii) a channel of "CH3," is first displayed.

According to Modification 2, the television set 100 is arranged such that the priority can be set by category and by channel. Modification 2 is, however, not limited to this. Alternatively, the television set 100 can be arranged such that the priority is set by another attribute value of program information. Examples of such another attribute value encompass broadcasting type (digital terrestrial/BS/CS etc.).

(Supplementation)

Note that it should be understood that Embodiment and Modifications described above are illustrative only and therefore impose no limitation. The scope of the present invention is defined not by the descriptions but by claims, and is intended to encompass all alterations within the meaning of and within the scope of the claims and their equivalents.

That is, a configuration of the program information notification device is not limited to the configurations described in each embodiment, and can be realized by adding diverse variations to the system configuration described in the embodiment, provided that the program information notification device can realize at least a function of "(i) determining, as program information to be notified to a user, a plurality of pieces of program information each of which matches a search condition set beforehand, from among a plurality of pieces of program information and (ii) notifying the user of the plurality of pieces of program information thus determined".

For example, the embodiment has discussed an example in which a television receiver is employed as the program information notification device. However, the program information notification device is not limited to such. Any devices can be employed as the program information notification device, provided that the any devices at least have a tuner function. Examples of such devices include a personal computer, a portable terminal device, a mobile phone, various pieces of recorder equipment, and an automobile navigation device. Further, it is not necessary that the program information notification device include a display device for displaying program information. The program information notification device can be a device which causes an external display device to display program information.

Further, according to the embodiment, a search condition is stored in the search condition storing section 320. However, the embodiment is not limited to such. For example, a search condition can be stored in external equipment. In this case, the program information notification device can be arranged to obtain the search condition from the external equipment as necessary. That is, it is not necessary that the program information notification device have a function of the search condition storing device 320. In this case, the external equipment can be one that is directly connected to the program information notification device, or one that is connected to the program information notification device via a network.

Further, according to the embodiment, program information is stored in the program information storing section 310. However, the embodiment is not limited to such. For example, program information can be stored in external equipment. In this case, the program information notification device can be arranged to obtain the program information from the external equipment as necessary. That is, it is not necessary that the program information notification device has a function of the program information storing section 310. In this case, the external equipment can be one that is directly connected to the program information notification device, or one that is connected to the program information notification device via a network.

Further, according to the embodiment, in a case where there are a plurality of pieces of program information to be displayed, the program information notification device sequentially displays, one by one, the plurality of pieces of program information. However, the embodiment is not limited to such. For example, the program information notification device can sequentially display, at a time, two or more of the plurality of pieces of program information. Further, according to the embodiment, the program information notification device displays the plurality of pieces of program information while horizontally scrolling them. However, the embodiment is not limited to such. For example, the program information notification device can display the plurality of pieces of program information while vertically scrolling them, or without scrolling them.

According to the embodiment, days and channels are employed as conditions for narrowing the plurality of pieces of program information as to whether or not to notify the plurality of pieces of program information. However, the embodiment is not limited to such. For example, time slots can be employed as conditions for narrowing the plurality of pieces of program information as to whether or not to notify the plurality of pieces of program information.

According to the embodiment, the program information notification device notify the user of program information right before (two minutes before) a start time of a program of the program information. However, the embodiment is not limited to such. For example, the program information notification device can notify the user of program information one hour or one day before a start time of a program of the program information. Alternatively, the program information notification device can notify the user of program information in morning, in a case where a program of the program information is to start in afternoon. Further, according to the embodiment, program information is notified to the user at startup of the television set 100 and at a start of a program of the program information. However, the program information notification device can notify the user of program information at other timings. For example, program information can be notified to the user at a timing at which a program that the user is currently watching ends.

CONCLUSION

As has been previously described, a program information notification device in accordance with the present invention includes: a determination section which determines, as program information to be notified to a user, ones of a plurality of pieces of program information each of which matches a search condition set beforehand, from among the plurality of pieces of program information; and a notification section which notifies the user of the ones of the plurality of pieces of program information thus determined.

According to the present invention, since the ones of the plurality of pieces of program information each of which matches the search condition are notified to the user, the user can recognize the ones of the plurality of pieces of program information each of which matches the search condition. This allows the user to determine and watch a program which more suits to the user's taste than the other(s) by, for example, comparing the ones of the plurality of pieces of program information. It is therefore possible to reduce risks that the user misses a program to the user's taste. That is, according to the present invention, it is possible to notify the user of program information which suits to the user's taste, in a form of notification more useful to the user.

Note that the program information notification device in accordance with the present invention is preferably arranged such that the notification section sequentially notifies, one by one, the user of the ones of the plurality of pieces of program information thus determined.

This allows a space, on a screen, for displaying the ones of the plurality of pieces of program information to be minimized even in a case where the ones of the plurality of pieces of program information are displayed and notified to the user. Therefore, it is possible to notify the user of the ones of the plurality of pieces of program information without needlessly hindering the user from viewing an image that is currently displayed on the screen.

Further, the program information notification device in accordance with the present invention is preferably arranged such that the notification section notifies, at startup of the program information notification device, the user of the ones of the plurality of pieces of program information which have been extracted.

It can be said that the startup of the program information notification device is a timing at which the user particularly wonders which program to view. According to the present invention, the ones of the plurality of pieces of program information are notified to the user at such a timing. This means that it is possible to notify the user of the ones of the plurality of pieces of program information at a timing useful to the user.

Further, the program information notification device in accordance with the present invention is preferably arranged such that the notification section (i) determines, from among the plurality of pieces of program information which have been extracted, ones of the plurality of pieces of program information to be preferentially displayed and (ii) notifies the user of the ones of the plurality of pieces of program information to be preferentially displayed.

According to the present invention, it is possible to minimize a space, on a screen, for displaying the ones of the plurality of pieces of program information even in a case where the ones of the plurality of pieces of program information are displayed and notified to the user. It is further possible to minimize a display time for displaying the ones of the plurality of pieces of program information. Therefore, it is possible to notify the user of the ones of the plurality of pieces of program information without needlessly hindering the user from viewing an image that is currently displayed on the screen.

Further, the program information notification device in accordance with the present invention is preferably arranged such that the notification section displays a list of the plurality of pieces of program information which have been extracted, in a case where a given operation is conducted by the user while the plurality of pieces of program information which have been extracted are being notified to the user.

According to the present invention, it is possible to notify the user of the plurality of pieces of program information without hindering the user from viewing an image that is currently displayed on a screen. In addition, the present invention allows the user to confirm remaining ones of the plurality of pieces of program information, which have not notified to the user, merely by causing the user to conduct the given operation.

Further, the program information notification device in accordance with the present invention is preferably arranged such that the list is a list of a plurality of pieces of program information each having a broadcast date identical to a broadcast date of a piece of program information that is being notified at a time when the given operation is conducted.

In a case where an operation for displaying a list of a plurality of pieces of program information is carried out by the user while a piece of program information is being displayed, the user is highly likely to wish to know what other pieces of program information are available as program information whose broadcast date is identical to a broadcast date of such a piece of program information. According to the present invention, the list of the plurality of pieces of program information each having a broadcast date identical to a broadcast date of a piece of program information that is being displayed is displayed, in a case where an operation for displaying the list of the plurality of pieces of program information is conducted. This makes it possible to notify the user of the plurality of pieces of program information which contain contents more useful to the user.

Further, the program information notification device in accordance with the present invention is preferably arranged such that, in a case where a plurality of pieces of program information, having identical start times, are extracted, the notification section notifies the user of the plurality of pieces of program information a predetermined time before the identical start time.

It can be said that a start time of a program is a timing at which the user particularly wonders which program to view. According to the present invention, the plurality of pieces of program information are notified to the user at such a timing. This means that it is possible to notify the user of the plurality of pieces of program information at a timing useful to the user.

The program information notification device in accordance with the present invention preferably further includes a channel selecting section which makes a channel selection so that the user can view a program of a piece of program information that is currently notified to the user, in a case where a given operation is conducted by the user while the plurality of pieces of program information having identical start times are being notified to the user.

According to the present invention, even in a case where the plurality of pieces of program information are displayed, it is not necessary to select, from among the plurality of pieces of program information, a piece of program information on a program which the user wishes to view. The user can easily select such a program by conducting the given operation while the piece of program information on such a program which the user wishes to watch is being displayed.

Further, the program information notification device in accordance with the present invention is preferably arranged such that the notification section (i) does not notify the user of any program information on a program to be broadcasted on a day of a week which is set beforehand as a non-notification day of the week and (ii) notifies the user of program information on a program to be broadcasted on a day of the week which is set beforehand as a notification day of the week, among the ones of the plurality of pieces of program information determined as program information to be notified to a user.

According to the present invention, no program information on a channel, which is highly likely not to be selected by the user, is notified to the user. It is therefore possible to notify the user of a plurality of pieces of program information which are more useful to the user.

Further, the program information notification device in accordance with the present invention is preferably arranged such that the notification section does not notify the user of any program information on a program to be broadcasted via a channel which is set beforehand as a non-notification channel, and notifies the user of program information on a program to be broadcasted via a channel which is set beforehand as a notification channel, among the ones of the plurality of pieces of program information thus determined as program information to be notified to a user.

According to the present invention, no program information on a program to be broadcasted on a day, which is highly likely not to be selected by the user, is notified to the user. It is therefore possible to notify the user of a plurality of pieces of program information which are more useful to the user.

Further, the program information notification device in accordance with the present invention is preferably arranged such that, in a case where a given operation is conducted so as to carry out a given function while a plurality of pieces of program information are sequentially being notified, the program information notification device carries out the given function with respect to a piece of program information that is currently notified.

Particularly, the program information notification device in accordance with the present invention is preferably arranged such that the given function includes at least one of channel selection, recording, display of detailed information, and split of a screen.

According to the present invention, the user can easily carry out the given function (especially, channel selection, recording, display of detailed information, and split of a screen) by conducting the given operation, in a case where a piece of program information in which the user shows an interest is displayed.

Further, the program information notification device is preferably arranged such that, in a case where no search condition is set, the program information notification device notifies the user of a message prompting the user to set a search condition.

According to the present invention, the program information notification device prompts the user to set the search condition. This allows the user to efficiently take advantage of the foregoing each function of the program information notification device.

Further, a television receiver in accordance with the present invention includes a program information notification device recited above.

According to the present invention, since a plurality of pieces of program information each of which matches a search condition are notified to a user, the user can recognize the plurality of pieces of program information. This allows the user to determine and watch a program which more suits to the user's taste by, for example, comparing the plurality of pieces of program information. That is, the user will never miss a program which more suits to the user's taste than the other(s). According to the present invention, it is possible to notify the user of program information which suits to the user's taste, in a form of notification more useful to the user.

Further, a program information notification method in accordance with the present invention includes the steps of: determining, as program information to be notified to a user, ones of a plurality of pieces of program information each of which matches a search condition set beforehand, from among the plurality of pieces of program information; and notifying the user of the ones of the plurality of pieces of program information thus determined.

According to the present invention, since the ones of the plurality of pieces of program information each of which matches the search condition are notified to the user, the user can recognize the ones of the plurality of pieces of program information. This allows the user to determine and watch a program which more suits to the user's taste then the other(s) by, for example, comparing the ones of the plurality of pieces of program information. It is therefore possible to reduce risks that the user misses a program to the user's taste. That is, according to the present invention, it is possible to notify the user of program information which suits to the user's taste, in a form of notification more useful to the user.

Note that the scope of the present invention also encompasses (i) a program for causing a computer to function as the program information notification device and (ii) a computer-readable recording medium in which such a program is recorded.

INDUSTRIAL APPLICABILITY

The present invention is applicable to a program information notification device capable of notifying a user of a plurality of pieces of program information each of which matches a search condition set beforehand, from among a plurality of pieces of program information. The present invention is further applicable to a program information notification system, a program information notification method, a program information notification program, and a recording medium.

REFERENCE SIGNS LIST

100 Television set
310 Program information storing section
320 Search condition storing section
330 Determination section
350 Timer section
340 Notification section
360 Channel selecting section

The invention claimed is:

1. A program information notification device comprising:
a determination section which determines, as program information to be notified to a user, ones of a plurality of pieces of program information each of which matches a search condition set beforehand, from among the plurality of pieces of program information; and
a notification section which notifies the user of the ones of the plurality of pieces of program information thus determined,
the notification section sequentially notifying, one by one, the user of (i) a first predetermined number of pieces of program information, each having a broadcast date which is a current day, to be preferentially displayed and then (ii) a second predetermined number of pieces of program information, each having a broadcast date which is a following day, to be preferentially displayed, from among the ones of the plurality of pieces of program information determined by the determination section,
after notifying the user of (i) the first predetermined number of pieces of program information and (ii) the second predetermined number of pieces of program information, the notification section notifying the user that there are third and fourth program information, having broadcast dates identical to respective of the current day and the following day, in a case where the third program information and the fourth program information further exist, respectively.

2. The program information notification device as set forth in claim 1, wherein
the notification section notifies, at startup of the program information notification device, the user of the ones of the plurality of pieces of program information which have been extracted.

3. The program information notification device as set forth in claim 1, wherein
the notification section displays a list of the plurality of pieces of program information which have been extracted, in a case where a given operation is conducted by the user while the plurality of pieces of program information which have been extracted are being notified to the user.

4. The program information notification device as set forth in claim 3, wherein,
the list is a list of a plurality of pieces of program information each having a broadcast date identical to a broadcast date of a piece of program information that is being notified at a time when the given operation is conducted.

5. The program information notification device as set forth in claim 1, wherein,
in a case where a plurality of pieces of program information, having identical start times, are extracted, the notification section notifies the user of the plurality of pieces of program information a given time before the identical start times.

6. A program information notification device as set forth in claim 5, further comprising
a channel selecting section which makes a channel selection so that the user can view a program of a piece of program information that is currently notified to the user, in a case where a given operation is conducted by the user while the plurality of pieces of program information having identical start times are being notified to the user.

7. The program information notification device as set forth in claim 1 wherein
the notification section (i) does not notify the user of any program information on a program to be broadcasted on a day of a week which is set beforehand as a non-notification day of the week and (ii) notifies the user of program information on a program to be broadcasted on a day of the week which is set beforehand as a notification day of the week, among the ones of the plurality of pieces of program information determined as program information to be notified to a user.

8. The program information notification device as set forth in claim 1, wherein
the notification section does not notify the user of any program information on a program to be broadcasted via a channel which is set beforehand as a non-notification channel, and notifies the user of program information on a program to be broadcasted via a channel which is set beforehand as a notification channel, among the ones of the plurality of pieces of program information thus determined as program information to be notified to a user.

9. The program information notification device as set forth in claim 1, wherein,
in a case where a given operation is conducted so as to carry out a given function while a plurality of pieces of program information are sequentially being notified, the program information notification device carries out the given function with respect to a piece of program information that is currently notified.

10. The program information notification device as set forth in claim 9, wherein
the given function includes at least one of channel selection, recording, display of detailed information, and split of a screen.

11. The program information notification device as set forth in claim 1, wherein,
in a case where no search condition is set, the program information notification device notifies the user of a message prompting the user to set a search condition.

12. A program information notification device comprising:
a determination section which determines, as program information to be notified to a user, ones of a plurality of pieces of program information each of which matches a search condition set beforehand, from among the plurality of pieces of program information; and a notification section which notifies the user of the ones of the plurality of pieces of program information thus determined, (A) at startup of the program information notification device, the notification section sequentially notifying, one by one, the user of (i) a first predetermined number of pieces of program information, each having a broadcast date which is a current day, to be preferentially displayed and then (ii) a second predetermined number of pieces of program information, each having a broadcast date which is a following day, to be preferentially displayed, from among the ones of the plurality of pieces of program information determined by the determination section, after notifying the user of (i) the first predetermined number of pieces of program information and (ii) the second predetermined number of pieces of program information, the notification section notifying the user that there are third and fourth program information, having broadcast dates identical to respective of the current day and the following day, in a case where the third program information and the fourth program information further exist, respectively, and the notification section displaying a list of a plurality of pieces of program information each having a broadcast date identical to a broadcast date of a piece of program information that is being notified, from among the ones of the plurality of pieces of program information thus determined, in a case where a given operation is conducted by the user while the first predetermined number of pieces of program information each having the broadcast date which is the current day or (ii) the second predetermined number of pieces of program information each having the broadcast date which is the following day are being notified to the user, (B) in a case where the determination section determines a plurality of pieces of program information having identical start times, the notification section notifying, one by one, the user of the plurality of pieces of program information a given time before the identical start times, and a channel selecting section of the program information notification device making a channel selection so that the user can view a program of a piece of program information that is currently notified to the user, in a case where a given operation is conducted by the user while the plurality of pieces of program information having identical start times are being notified to the user, and (C) in a case where a non-notification day of a week and a notification day of the week are set for the program information notification device, the notification section (a) not notifying the user of any program information on a program to be broadcasted on the non-notification day of the week and (b) notifying the user of program information on a program to be broadcasted on the notification day of the week, among the ones of the plurality of pieces of program information thus determined.

13. A television receiver comprising a program information notification device recited in claim 1.

14. A program information notification method comprising the steps of:

(a) determining, as program information to be notified to a user, ones of a plurality of pieces of program information each of which matches a search condition set beforehand, from among the plurality of pieces of program information; and (b) notifying the user of the ones of the plurality of pieces of program information thus determined, the step (b) including the steps of:

notifying, one by one, the user of (i) a first predetermined number of pieces of program information, each having a broadcast date which is a current day, to be preferentially displayed and then (ii) a second predetermined number of pieces of program information, each having a broadcast date which is a following day, to be preferentially displayed, from among the ones of the plurality of pieces of program information determined by the determination section, after notifying the user of (i) the first predetermined number of pieces of program information and (ii) the second predetermined number of pieces of program information, notifying the user that there are third and fourth program information, having broadcast dates identical to respective of the current day and the following day, in a case where the third program information and the fourth program information further exist, respectively.

15. A non-transitory computer-readable recording medium in which a program for causing a computer to operate as each means of a program information notification device as set forth in claim 1 is stored.

* * * * *